United States Patent
Zirwas et al.

(10) Patent No.: US 10,454,645 B2
(45) Date of Patent: Oct. 22, 2019

(54) COORDINATED MULTIPOINT TRANSMISSION

(75) Inventors: Wolfgang Zirwas, München (DE); Mieszko Chmiel, Wroclaw (PL); Matti Tapani Kiiski, Oulunsalo (FI); Egon Schulz, London (GB)

(73) Assignee: HMD Global Oy, Espoo (FI)

( * ) Notice: Subject to any disclaimer, the term of this patent is extended or adjusted under 35 U.S.C. 154(b) by 949 days.

(21) Appl. No.: 13/390,344

(22) PCT Filed: Aug. 14, 2009

(86) PCT No.: PCT/EP2009/060568
§ 371 (c)(1),
(2), (4) Date: Mar. 26, 2012

(87) PCT Pub. No.: WO2011/018121
PCT Pub. Date: Feb. 17, 2011

(65) Prior Publication Data
US 2012/0176982 A1    Jul. 12, 2012

(51) Int. Cl.
| | | |
|---|---|---|
| *H04W 72/04* | (2009.01) | |
| *H04L 5/00* | (2006.01) | |
| *H04B 7/024* | (2017.01) | |
| *H04L 25/02* | (2006.01) | |
| *H04L 27/26* | (2006.01) | |
| *H04B 7/06* | (2006.01) | |

(52) U.S. Cl.
CPC .......... *H04L 5/0051* (2013.01); *H04B 7/024* (2013.01); *H04L 25/0228* (2013.01); *H04L 27/261* (2013.01); *H04B 7/0671* (2013.01); *H04L 5/0037* (2013.01)

(58) Field of Classification Search
CPC ..... H04B 7/024; H04B 7/0671; H04L 5/0051; H04L 25/0228; H04L 27/261; H04L 5/0037
USPC ........................................ 370/329
See application file for complete search history.

(56) References Cited

U.S. PATENT DOCUMENTS

2008/0239938 A1    10/2008  Jalloul et al.
2010/0008282 A1*    1/2010  Bhattad ................ H04J 11/0069
                                                  370/312
(Continued)

FOREIGN PATENT DOCUMENTS

| CN | 101080913 A | 11/2007 |
| CN | 10148387f3 A | 7/2009 |
| EP | 1420604 B1 | 9/2006 |

OTHER PUBLICATIONS

U.S. Appl. No. 61/210,291, filed Mar. 17, 2009 has been attached as a NPL.*

(Continued)

*Primary Examiner* — Faisal Choudhury
(74) *Attorney, Agent, or Firm* — Harrington & Smith

(57) ABSTRACT

A method is described, which includes controlling a coordinated transmission between network control elements and terminals on resource elements, detecting whether a resource element includes a specific element, and selecting a resource element for the coordinated transmission, when it is detected that the resource element does not include a specific element. The application also describes some further aspects to improve a coordinated transmission such as a coordinated multipoint transmission is improved.

28 Claims, 16 Drawing Sheets

(56) References Cited

U.S. PATENT DOCUMENTS

| | | | |
|---|---|---|---|
| 2010/0238821 A1* | 9/2010 | Liu ..................... | H04L 43/045 |
| | | | 370/252 |
| 2010/0322165 A1* | 12/2010 | Yoo ..................... | H04L 1/1812 |
| | | | 370/329 |
| 2011/0038330 A1* | 2/2011 | Luo ..................... | H04B 7/024 |
| | | | 370/329 |
| 2011/0183669 A1* | 7/2011 | Kazmi ................ | H04J 11/0086 |
| | | | 455/434 |
| 2011/0292900 A1* | 12/2011 | Ahn ..................... | H04L 1/1607 |
| | | | 370/329 |

OTHER PUBLICATIONS

U.S. Appl. No. 61/230,068, filed Jul. 30, 2009 has been attached as a NPL.*
NPL: 3GPP TSG RAN WG1 meeting # 56, R1-090821; Solution for DL CoMP Transmission; Athens, Greece; Feb. 9-13, 2009.*
Huawei et al.; "Further Discussions on the Downlink Coordinated Transmission—Impact on the Radio Interface"; 3GPP TSG RAN WG1 Meeting #55bis; R1-090129; Ljubljana, Slovenia, Jan. 12-16, 2009; whole document (8 pages).
R1-090070, "Resource Mapping Issues on JP Transmission in CoMP", 3GPP TSG-RAN WG1 Meeting #55bis, Ljubljana, Slovenia, Jan. 12-16, 2009, ZTE, 4 pgs.
R1-090820, "Impacts of Downlink CoMP Transmission on radio Interface, Transmitter and Receiver Behavior", 3GPP TSG RAN WG1 Meeting #56, Athens, Greece, Jan. 12, 2009-Feb. 9, 2009, Huawei, 8 pgs.
R1-091868, "Design Considerations for COMP Joint Transmission", 3GPP TSG RAN WG1 Meeting #57, "Design Considerations for COMP Joint Transmission", San Francisco, USA, May 4-8, 2009, Samsung, 10 pgs.

* cited by examiner

Fig. 9A
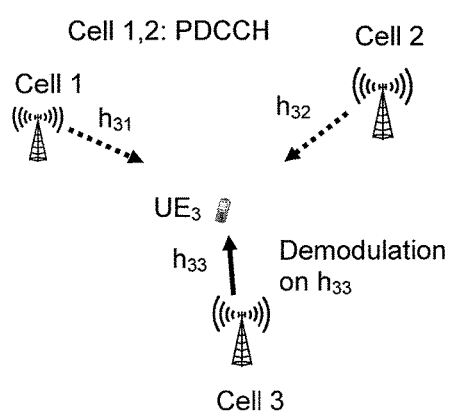
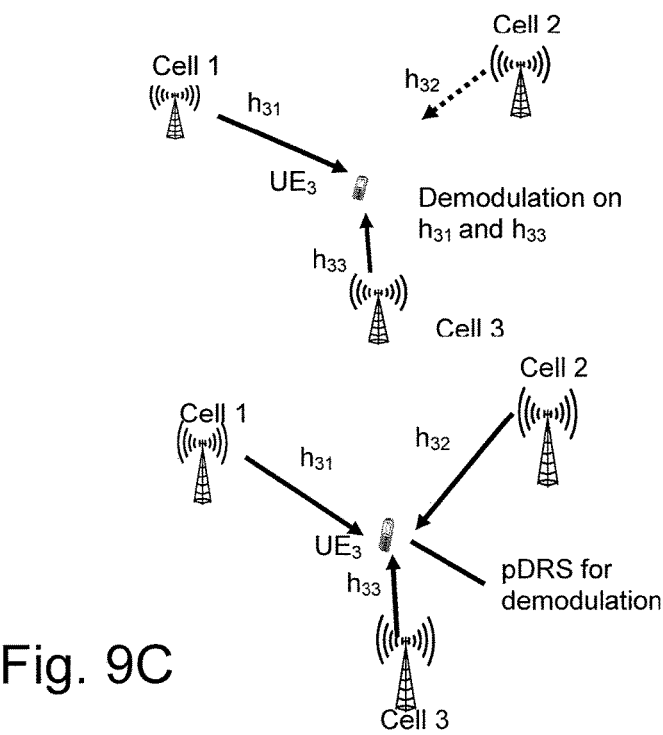
Fig. 9C
pDRS: $w_{31}*h_{31} + w_{32}*h_{32} + w_{33}*h_{33} = a*e^{j\varphi}$

COORDINATED MULTIPOINT TRANSMISSION

FIELD OF THE INVENTION

The present invention relates to an apparatus, method and computer program product which refer to improvements in connection with a coordinated transmission involving a plurality of network elements and/or terminals, in particular coordinated multipoint (CoMP) transmission.

RELATED BACKGROUND ART

The following meanings for the abbreviations used in this specification apply:
A&F: amplify and forward
AP: antenna port
BER: bit error rate
BS: base station
CAS: cooperation areas
CCE control channel element
CDF: cumulative distribution function
C-MIMO: cooperative multi input multi output
CoMP: coordinated multipoint
COOPA: cooperative antenna
CQI: channel quality indicator
CRS: common reference signal
CSI: channel state information
D&F: decode and forward
DL: downlink
eNB: evolved Node B (eNodeB)
FDD: frequency division duplex
GI: guard interval
HARQ: hybrid automatic repeat request
LOS: line of sight
MS: mobile station
MCS: modulation and coding scheme
MIMO: multiple input multiple output
MU-MIMO: multi user MIMO
NB: NodeB
OFDM: orthogonal frequency division multiplexing
OFDMA: orthogonal frequency division multiple access
PDCCH: physical downlink control channel
pDRS: precoded dedicated reference signal)
PDSCH: physical downlink shared channel
PRB: physical resource block
R8: Release 8
RB: resource block
RE: resource element
RNTI: radio network temporary identifiers
RS: reference signal
RRM: radio resource management
RS: reference signal
SC: subcarrier
SDM: spatial division multiplexing
SINR: signal to noise and interference ratio
TDM: time division multiplexing
TDD: time division duplex
UE: User equipment
ZF: zero forcing The present application relates to, among others and not limited thereon, channel estimation. Channel estimation for broadband mobile radio systems is generally a challenge due to a large time variance and frequency selectivity of the radio channels in case of fast moving UEs. In case of cooperative antenna (COOPA) systems, where a coherent precoding of data signals from different transmission sites is intended, the challenge is even higher due to the higher number of radio channels as well as the required high accuracy with respect to the channel state information (CSI) estimates.

Recently, 3GPP is investigating in the so called LTE Advanced study item techniques to increase performance significantly, and so the called cooperative or coordinated multipoint transmission (CoMP) has been identified as one of the main techniques to increase spectral efficiency. Different CoMP techniques have been identified, where the more powerful ones transmit simultaneously precoded data from different eNBs to several UEs on the same time frequency resource. Coherent precoding—while adding complexity and leading to quite some overhead regarding channel estimation, feedback and backhaul traffic—promise significant performance gains as they allow for optimum interference cancellation and have inherent diversity gains. From theory large gains in the order of several 100% have been predicted.

As LTE advanced is seen as an evolution from LTE Rel. 8, full backward compatibility is generally requested.

This, however, poses problems in particular in connection with CoMP, since the techniques used for CoMP partly contradict to those techniques currently used, e.g., in LTE Rel. 8.

Furthermore, there occurs a problem that in connection with different kinds of reference signals (such as channel state information (CSI) reference signals (RS), predecoded dedicated reference signals (pDRS, also known as demodulation reference signal DM-RS) and common reference signals (CRS)), a large overhead might be produced, which compromises the improvements achieved by CoMP.

In addition, the above problems may also occur in other coordinated transmission techniques than CoMP, e.g., in MU-MIMO (multi user multiple in multiple out) etc.

SUMMARY OF THE INVENTION

Thus, it is an object of the present invention to overcome the above problem of the prior art.

According to a first aspect, a coordinated transmission between network control elements and terminals on resource elements is controlled. It is detected whether a resource element comprises a specific element, and a resource element for the coordinated transmission is selected, when it is detected that the resource element does not comprise a specific element.

The specific element may be a reference signal (e.g., CRS (common reference signal)) or a control channel symbol used for a control channel (e.g., a PDCCH (physical downlink control channel) symbol).

According to a further aspect, transmitting of reference signals in resource elements of a resource block in a coordinated transmission between network control elements and terminals is controlled. For a sequence of reference signals, a single reference signal for all terminals is used, and the single reference signal is spatially precoded for each terminal.

The reference signal may be a pDRS (precoded dedicated reference signal).

According to a further aspect, an orthogonal precoded dedicated reference signal is sent from a network element to a terminal. The terminal estimates a channel estimation result using the precoded dedicated reference signal, and the network element receives the channel estimation result from the terminal. Based on the received channel estimation result, the network element determines channel information.

The coordinated transmission mentioned above may be a multipoint coordinated (CoMP) transmission or a multi-user multiple input multiple output (MU-MIMO) transmission or similar.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIGS. 9A to 9C show of demodulation for one user equipment (UE3) only for different phases according to the second embodiment.

DETAILED DESCRIPTION OF EMBODIMENTS

Figure 1:
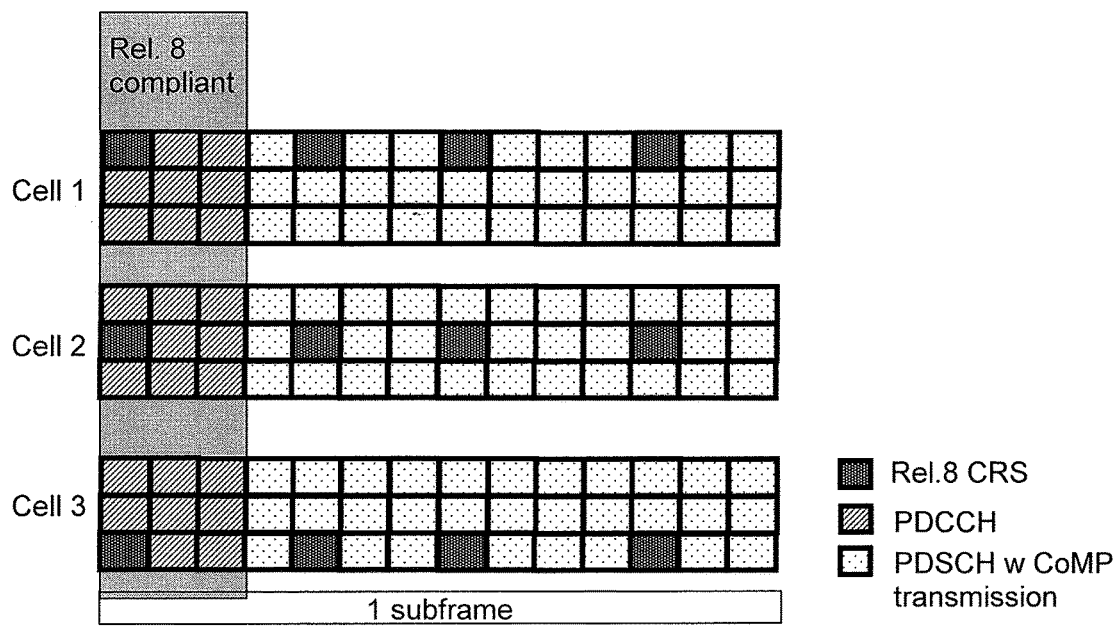
FIG. 1 illustrates LTE Rel.8 CRS locations in a case with 3 different frequency shifts.

In the following, embodiments of the present invention are described by referring to general and specific examples of the embodiments. It is to be understood, however, that the description is given by way of example only, and that the described embodiments are by no means to be understood as limiting the present invention thereto.

First Embodiment

According to a first embodiment of the present invention, CoMP transmission in combination with frequency shifts (as defined in Rel. 8, for example) is considered.

In the following, the prior art in connection with this is described.

For LTE Release 8 a grid of so called common reference signals (CRS) has been defined. For example, antenna port AP1 has RSs every $6^{th}$ subcarrier in the OFDM symbols 1, 5, 9 and 12. As LTE is a cellular radio system with frequency reuse 1, all cells transmit cell specific CRSs with specific scrambling sequences. In order to reduce intercell interference between CRSs from different cells, further 3 different so called frequency shifts have been defined, meaning that the CRSs for cell 1 start e.g. with subcarrier (SC) SC1, of cell 2 with SC2 and for cell 3 with SC3 at the corresponding OFDM symbols. The frequency shifts are tightly coupled to the cell IDs and avoid that CRSs from adjacent cells are always colliding with the same RS signals from the other cells, thereby improving overall (multi) cell channel estimation accuracy.

The mobile network operator (MNO) can control the frequency shifts by allocating corresponding cell IDs to sites.

In LTE Rel. 8 each cell may use all its resource elements (RE) not used for the CRSs for data transmission over the so called physical downlink shared channel (PDSCH).

As described above, the so called cooperative or coordinated multipoint transmission (CoMP) has been identified as one of the main techniques to increase spectral efficiency. As LTE advanced is seen as an evolution from LTE Rel. 8, full backward compatibility is generally requested. This includes that CRSs should be transmitted fully in line with LTE Release 8. Regarding the frequency shifts from Releases 8 this leads to a conflict for eNB cooperation, if REs which carry CRSs have different frequency shifts in different cooperating cells. These REs carry in one cell data bins and in the other CRSs, avoiding simultaneous transmission from all cells.

In LTE Advanced as way forward it has been agreed that there will be so called CSI-RS for CSI estimation sparse in time and frequency and in addition pDRS on resources used for CoMP or 8TX antennas for demodulation. In addition there will be the Release 8 CRSs with the goal to have full backward compatibility for Rel. 8 UEs.

As described above, specifically the cell specific frequency shifts as defined for Rel. 8 are a challenge for CoMP systems, where all eNBs have to transmit simultaneously on the same REs the properly precoded data signals.

The challenge becomes clear from FIG. 1. FIG. 1 shows LTE Rel.8 CRS locations in case with 3 different frequency shifts. In particular, in FIG. 1 a small part of a so called physical resource block (PRB) is depicted for three cells. A PRB pair consists of 12 SCs and 14 OFDM symbols, forming a so called subframe of length 1 ms. Only 3 out of the 12 SC are shown as this is sufficient here. It can be clearly seen that to each cell a different frequency shift is given, meaning that the location of the CRSs are shifted by one SC. Cooperation on REs carrying CRS in one of cells is blocked, as common simultaneous transmission from all eNBs is not possible for these REs.

Here only one AP, i.e. APO is analyzed, but the basic situation is quite similar also for the other APs, i.e. AP1 to 3.

A further issue, which has to be taken into account, is that there is a strong trend into so called transparent precoding solutions for CoMP transmissions, meaning that the UEs are not aware of the applied precoder at the eNBs. For that purpose e.g. in the way forward it has been agreed to use so called precoded dedicated RSs (pDRS) for demodulation at the UE, allowing for any precoding scheme without explicit notification of the UE.

As mentioned above, as a solution for the issue of frequency shifts, it has been proposed to control the cell IDs in the network so that different frequency shifts can be avoided.

This solution has its benefits as it does not require any changes to LTE or LTE Advanced as network planning is allowed by MNOs already today. Nonetheless there are some critical issues like

- Multi cell channel estimation accuracy based on non shifted CRSs might suffer so that at least Rel. 8 UEs performance might be degraded.
- There might be some impact (e.g. reduced interference randomization) on the PDCCH within the first 3 OFDM symbols due to the missing shifts.
- MNOs might have running LTE Rel.8 networks, where cell IDs are already allocated with their corresponding frequency shifts, so reorganisation of cell IDs might lead to some cumbersome RRM (radio resource management) issues.
- The cell IDs with their corresponding frequency shifts define also codes for the so called primary and secondary synchronization channels (PSS/SSS). So without frequency shifts the overall synchronization process might suffer as less codes are used.
- In case of strong shadowing with varying LOS (line of sight) and NLOS (non-line of sight) conditions there might be far off eNBs as strongest interferers. For that reason user centric definition of cooperation areas is in such scenarios much more powerful as it defines the cooperation areas based on the strongest interferers seen by the UEs. This complicates the avoiding of frequency shifts by cell planning. The only possibility to solve this is to apply in the whole network the same frequency shift.

Another possibility to overcome the problem would be to use blanking on REs carrying CRSs in adjacent radio cells. This is a clean solution. At the same time it leads to extremely large overhead in the order of 30% for the support of 2 APs only. Such overhead is seen as being prohibitively large.

Thus, it is a goal of the present embodiment to provide a backward LTE Release 8 compatible solution for CoMP transmission schemes for LTE Advanced which allows coherent precoding in case of CRSs with different frequency shifts for the cooperating radio cells.

According to the present embodiment, cooperation is restricted to those eNBs and UEs of a cooperation area, which are currently not transmitting any CRSs.

Figure 2A:
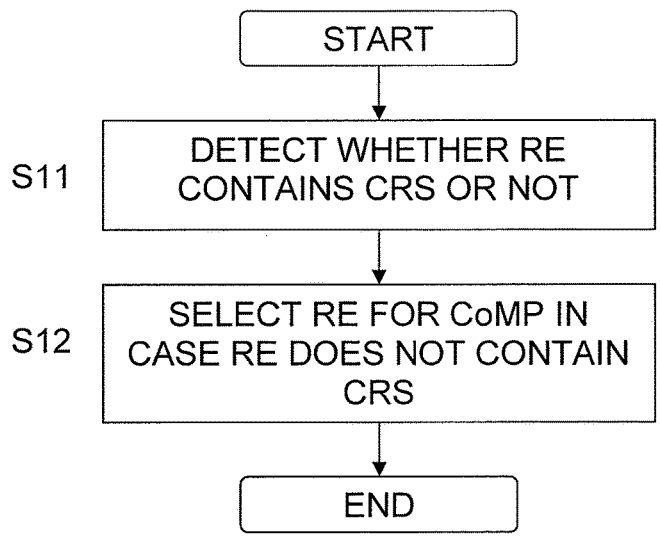
FIG. 2A shows a method according to a first and second embodiment.
Figure 2B:
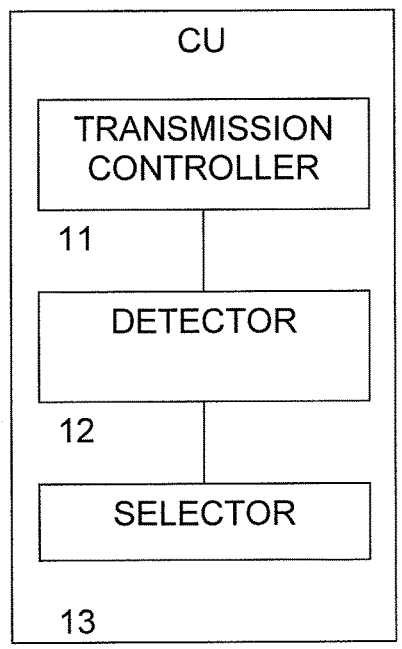
FIG. 2B shows an apparatus according to the first and second embodiment.

A more general example for the first embodiment is described in the following by referring to FIGS. 2A and 2B, wherein FIG. 2A shows a method according to a first embodiment, and FIG. 2B shows a control unit (CU) as an example for an apparatus according to the first embodiment.

In FIG. 2A, a general example for a method according to the first embodiment is shown, in which method a coordinated multipoint transmission between network control elements and terminals on resource elements is controlled. In step S11, it is detected whether a resource element comprises a specific element, and in step S12 a resource element for coordinated mobile transmission is selected, when it is detected that the resource element does not comprise a specific element.

FIG. 2B shows an example for an apparatus according to the first embodiment. Here, it is assumed that the apparatus is or is part of a central unit (CU), but alternatively the apparatus may be or may be part of other suitable elements, for example a NodeB or eNodeB. The apparatus comprises a transmission controller (means for controlling transmission) 11, controls a coordinated multipoint transmission between network control elements and terminals on resource elements. Furthermore, the apparatus comprises a detector (detecting means) 12 which detects whether a resource element (RE) contains a specific element. Moreover, the apparatus comprises a selector 13 which selects a resource element for coordinated mobile transmission when it is detected that the resource element does not contain the specific element.

It is noted that the transmission controller 11, the detector 12 and the selector 13 may be provided as one unit. That is, for example a processor of the CU or an eNode-B (not shown) may be configured to perform the functions of these elements. Thus, according to the first embodiment, only those resource elements are used which do not contain any specific elements are actually used for coordinated mobile transmission (CoMP).

According to a more specific example of the first embodiment, the specific elements include reference signals such as the common reference signal (CRS) mentioned above.

Figure 3:
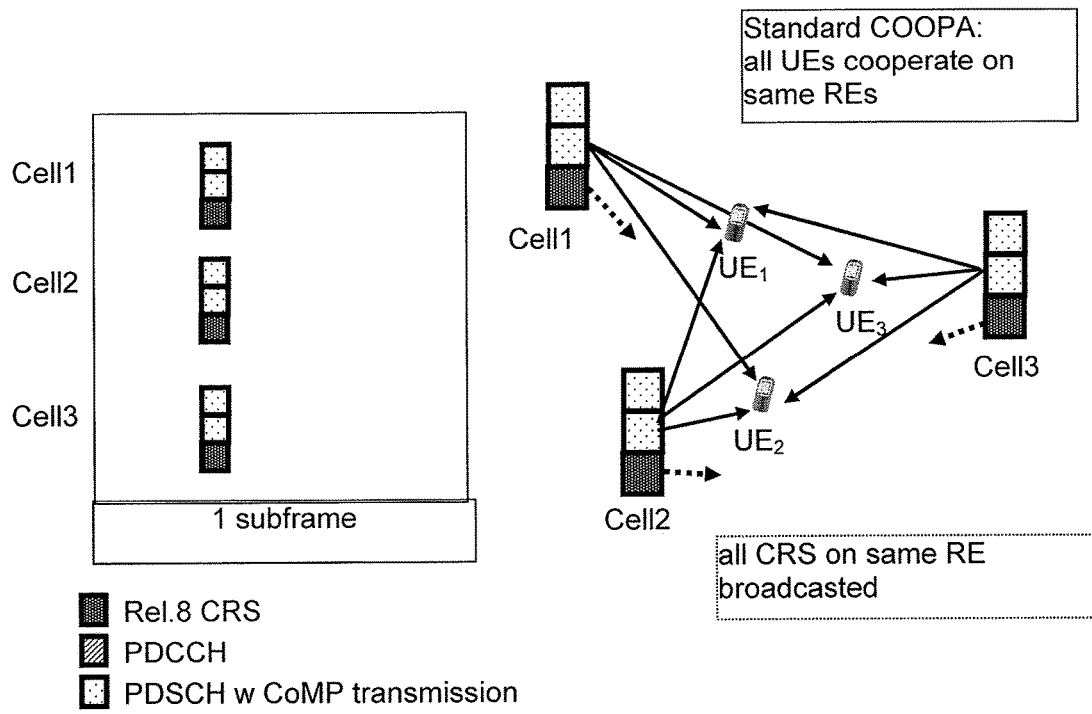
FIG. 3 illustrates a conventional CoMP scheme with coordinated CRSs, allowing cooperating on the other REs.
Figure 4:
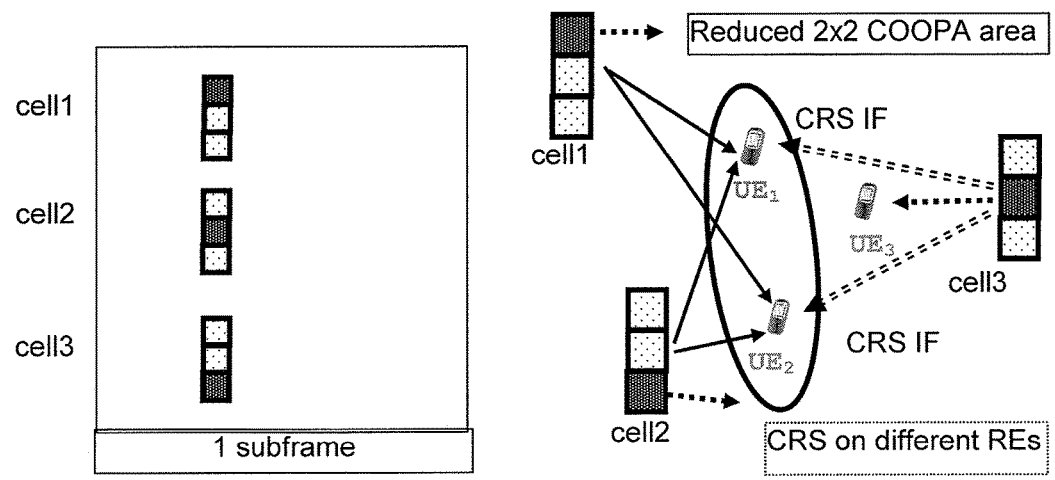
FIG. 4 shows reduced size cooperation areas in case of blocked REs in cell 3 due to CRS according to the first embodiment.

For better understanding it is referred to FIG. 3 and FIG. 4 in the following. FIG. 3 shows a conventional CoMP scheme with coordinated CRSs, allowing to cooperate on the other REs. FIG. 4 shows reduced size cooperation areas in case of blocked REs in cell 3 due to CRS according to the present embodiment. The interference from CRS of cell 3 due to its CRSs can be corrected for known radio channels from eNB3 to $UE_1$ and $UE_2$, as will be described in the following.

In FIG. 3 no frequency shifts are being assumed, which might be guaranteed for example by corresponding network planning, neglecting its disadvantages as explained above. In that case from CoMP perspective the situation is easy and all 3 UEs are served on all REs without CRSs. The REs with CRSs are not used at all for cooperation, but just for transmission of Rel.8 compatible CRSs.

In FIG. 4, frequency shifts are introduced. Conventionally this would mean that there will be no cooperation at all on these REs (see for example RE2, where cell 3 transmits its CRS signal).

Here it is proposed to restrict cooperation to cells 1 and 2 for this RE, thereby as much as possible cooperation gain can be achieved. At the same time compared to the conventional solution there will be the disadvantage of increased interference due to the CRS signal transmission from cell 3. But here we have to remember that known interference is no interference. This opens two different options:

a) Interference cancellation at the UE based on known radio channels from cell 3 to UE1 and UE2 as well as known CRSs with their corresponding cell specific scrambling sequence, frequency shifts, etc. This will lead to a non transparent solution as the UEs have to know all cell IDs which serve them to calculate the corresponding CRS transmission signals and to multiply them with the corresponding radio channels $h_{13}$ and $h_{23}$. In addition the precoding has to be known. In that case the UE can just substract the $h_{13}*\text{Tx}_{CRS,cell3}$ ($\text{Tx}_{CRS,cell3}$ is the transmit signal for the CRS of cell 3) from its decoded signal to get the interference free version. It is noted that Cell IDs participating in the cooperation are probably known anyway at the UEs as for coherent precoding corresponding reporting of the radio channels for these cells has to be organized, but precoding might change quite fast.

b) A fully UE transparent solution is possible by taking care of the interference due to the CRS from cell 3 directly in the central unit (CU) by corresponding pre compensation. At the CU anyway all information—radio channels from all eNBs to all cooperating UEs, frequency shifts, cell IDs, scrambling sequences, cooperating cells for the current PRB, etc.—will be available, at least for the here investigated coherent precoding solutions. This allows to subtract already at the CU $h_{13}*\text{Tx}_{CRS,cell3}$ for UE1 and $h_{23}*\text{Tx}_{CRS,cell3}$ for UE2.

Figure 5:
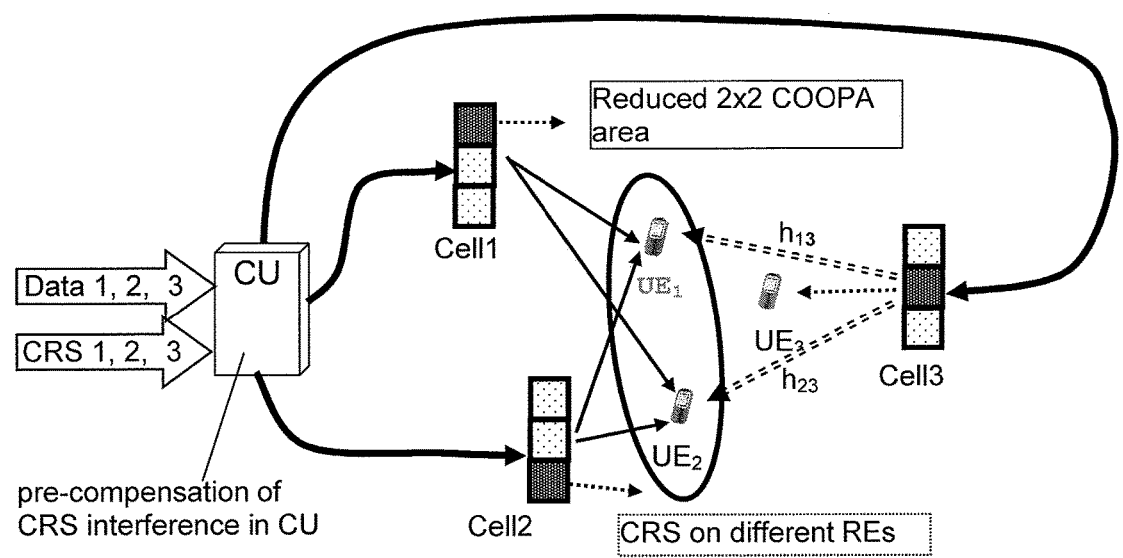
FIG. 5 shows precompensation of interference due to CRS of non cooperating cell into reduced size cooperation area based on knowledge of data, CRS (scrambling, seed, etc.) and estimated radio channels of all cells according to the first embodiment.

FIG. 5 shows a schematic of the proposed precompensation, and illustrates precompensation of interference due to CRS of non cooperating cell into reduced size cooperation area based on knowledge of data, CRS (scrambling, seed, etc.) and estimated radio channels of all cells. As shown in FIG. 5, only cells 1 and 2 take part in the CoMP transmission. The interference due to CRS from cell 3 to the UE1 and UE2 is indicated by the dashed double arrows denoted by $h_{13}$ and $h_{23}$.

The scheme according to the present embodiment has several advantages:

- It allows for a fully backward compatible solution with Rel. 8 CRSs exhibiting cell specific frequency shifts.
- It avoids any complications with PDCCH or synchronization based on PSS/SSS due to missing frequency shifts and performance degradations of multi cell channel estimation.
- There is no need for specific cell ID planning.
- The solution is fully transparent, which is a main benefit. As mentioned above, also non transparent solutions are possible with respect to the UEs. UEs can be fully unaware of the frequency shift issue and do not have any extra processing requirements.
- There is no performance degradation due to the limited size of the cooperation area as this would be typically the case. To understand this, one has to keep in mind that coherent precoding is applied to overcome inter cell interference and cancels this interference within the cooperation areas so that only inter cooperation area interference will remain. In that sense cancelling the interference due to CRS transmission by corresponding pre compensation yields the same effect as that of real cooperation with this cell.
- In addition the overall number of usable resources with and without frequency shift does not change for the proposed scheme which simplifies rate matching. For the conventional cooperation without frequency shifts there will be one out of three REs not being used by any of the cells for PDSCH. So overall there are 2 REs serving 3 UEs, i.e. overall 6 out of 9 data bins can be used for data transmission. In case of frequency shifting there will be 3 times 2 UEs being served, which is again 6 out of 9 data bins.
- In case of coherent precoding no extra feedback or channel estimation is required, but all required information is already available, if the overall scheme is designed accordingly.

Second Embodiment

According to the second embodiment, it is also considered that a reference element which contains a specific element is not used for CoMP, similar as in the first embodiment. However, according to the present embodiment an example for such a specific element is a control channel symbol such as a PDCCH symbol. This will be explained in the following in more detail.

Namely, the second embodiment is directed to a CoMP solution in case of PDCCH mismatch, as will be described in the following.

In the following, the prior art in connection with this is described first.

As already mentioned in the introductory part of the present application, for LTE Advanced so called Coordinated multi point transmission (CoMP) is investigated within a study item and there has been an agreed way forward, saying that there are RSs for CSI estimation, which should be sparse in time and frequency as well as precoded dedicated reference signals (pDRS) for demodulation. The pDRS are for demodulation and are transmitted only on those PRBs with data transmission, saving unnecessary overhead. pDRS are precoded with the same precoder as the corresponding data signals.

CoMP UEs (i.e., UEs taking part in a CoMP transmission) are controlled from so-called anchor cells over physical downlink transport channels (PDCCH). Each UE is connected to its anchor cell, where the anchor cell is being selected based on the strongest receive power.

For the PDSCH transmission of the coherently precoded data all cooperating eNBs transmit simultaneously on the same resources.

This works fine as long as the number of PDCCH symbols—according to LTE Rel. 8 the PCFICH can change the number of OFDM symbols between 1 and 3—in all cooperating cells is the same. Generally each cell might have for each subframe different numbers of PDCCH OFDM symbols so that cooperation on the first 3 symbols of each subframe gets challenging. If cooperation is always restricted to the 11 OFDM symbols following the first 3 OFDM symbols, quite significant overhead is induced.

Thus, a goal of the present embodiment (but not limited to this) is to allow for transparent and efficient support of coherent precoding CoMP solutions allowing different number of PDCCH OFDM symbols for each cell of a cooperating area.

That is, the problem to be solved is coherent precoding of PDSCHs in cooperation areas with varying and specifically different number of OFDM symbol per subframe. Note, subframes have a length of 1 ms, consist of 14 or 12 OFDM symbols and have 1-3 OFDM symbols for PDCCH, where the PCFICH indicates the length of the PDCCH of the current subframe.

Figure 6:
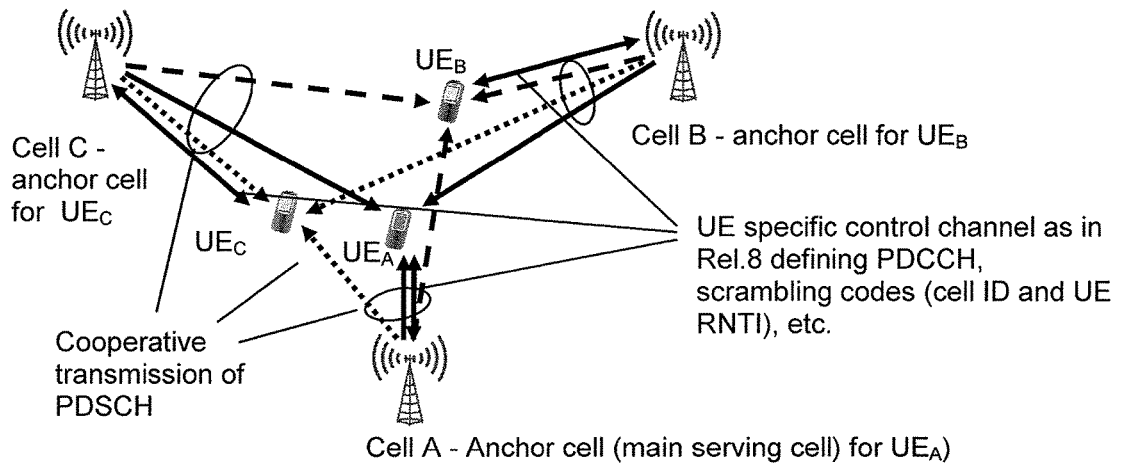
FIG. 6 shows a basic concept of CoMP according to the second embodiment.

In FIG. 6, the principles with respect to CoMP are shown. In detail, FIG. 6 shows the basic concept for CoMP: cooperation on PDSCH and each UE listens to PDCCH of its anchor cell only, i.e. on PDCCH there is no cooperation. PDCCH is indicated by the double arrows having solid lines, whereas the CoMP transmissions are indicated by single arrows (solid arrow for $UE_A$, large-hatched arrow for $UE_B$ and small-hatched for $UE_C$.

As mentioned above, it is a goal to keep Rel. 8 concept as far as possible, i.e., to maintain backwards compatibility. Moreover, the physical layer (PHY) should be separated from higher layers.

Thus, it is proposed that each UE listens only to its anchor cell (sometimes also referred to as serving cell, which selected during handover (HO) due to strongest signal power. Furthermore, the PDCCH is similar to Rel 8 with some further CCEs (control channel element) for semistatic selection of C-MIMO (cooperative multi input multi output) mode for UEs and definition of a reporting mode of UE (cell IDs, time frame etc.). Advantages achieved are: Advantages are that fast switching between C-MIMO and single cell Tx possible, that Rel. 8 features can be reused as far as possible, that UE transparent precoding solutions are possible, and that no confusion with cell and UE specific scrambling may occur.

Regarding pDRS, it is noted that they are orthogonal for at least 8 streams, that FDM/TDM/CDM per stream is possible, and that higher layer signalling (RRC) of sequence number per stream is possible. Furthermore, a semi static adaptation together with C-MIMO mode is possible. Alternatively, a fixed cell to stream mapping is possible.

FIG. 6 illustrates the concept of the anchor cells, where each anchor cell controls its UEs. As a result, the PDCCHs are transmitted without cooperation, more or less fully in line with LTE Rel. 8. The assumption is that for LTE Advanced only few new RRC messages are required, e.g. to set UEs semi statically into CoMP mode and therefore the same already working control mechanisms can be reused. This includes sufficient coverage for the PDCCH messages as well as sufficient inter cell interference robustness.

For data transmission of PDSCH signals, the anchor cell and the anchor cells of the cooperation area transmit simultaneously to achieve the hopefully large performance gains from coherent precoding. For coherent precoding there is an easy separation between PHY layer and higher layers. This means that the precoding (PHY) is done cooperatively from the different cells, while cell and UE specific scrambling codes and interleavers, UE RNTIs (radio network temporary identifiers) etc will be defined based on the anchor cell and it will be task of the network to coordinate the cooperative transmission accordingly.

As already mentioned, full backward compatibility of LTE advanced with Release 8 should be achieved. For Release 8 the so called common reference signals (CRS) have been defined and it is common understanding that these CRS will have to be transmitted continuously for full backward compatibility. The CRSs can be used for demodulation of the PDCCH signals, as these have been transmitted from the anchor cell only. The first OFDM symbol will be always a PDCCH symbol so that for this symbol always CRSs can be used.

As already mentioned above, in LTE Advanced as way forward there will be the CSI-RS for CSI estimation sparse in time and frequency and in addition precoded dedicated reference signals (pDRS) on resources used for CoMP or 8 TX antennas for demodulation.

pDRS and data are precoded by the same CoMP precoder, so that the precoding is transparent to the UEs, meaning they do not have to know the precoder for demodulation. These pDRS can/have to be used for the demodulation of the coherently precoded signals in the last 11 OFDM symbols of the subframe.

The critical area are the OFDM symbols #2 and 3, as for these symbols some cells might want to transmit PDCCH signals (one cell only) and others wants to transmit PDSCH data cooperatively.

In the prior art, different options were identified how to handle the above described issue, like limiting CoMP transmission to the last 11 OFDM symbols (or 9 OFDM symbols for the extended cyclic prefix), fast signalling of PFCICH per cell and corresponding adaptation of the transmission, using common control zone for CoMP transmission of same length etc.

Interesting is specifically the proposal to use non CoMP transmission of PDSCH signals in case one or more cells have still some PDCCH signals on this OFDM symbol.

The disadvantage of this solution is that for the first non CoMP PDSCH OFDM symbols, the CRSs have to be used, while for the rest of the subframe the pDRS have to be used for demodulation. Thus, this proposal increases UE complexity, is non-transparent, as UEs have to be informed whether the second and third OFDM have to be demodulated based on CRSs or on pDRS, and generates a lot of control overhead for signaling OFDM symbols being in CoMP mode for each subframe.

According to the present embodiment, a special procedure for the first 3 symbols is proposed, wherein only those cells are involved into CoMP where the symbol is not used for PDCCH. Hence, the first 3 symbols can be used for CoMP, too. This will be described in more detail in the following.

In particular, a more general form according to the present embodiments is similar as described above in connection with the first embodiment as shown in FIGS. 2A and 2B. That is, basically only those resource elements are used for CoMP, which do not contain a specific element, which is in case of the second embodiment a control channel symbol used for a control channel, e.g., a PDCCH symbol as described above.

Thus, the general form according to the second embodiment is similar to that according to the first embodiment; therefore a detailed description thereof is not repeated here. It is noted that according to the second embodiment, the detector may be configured such that it detects whether a resource element contains a specific element by referring to a control format indicator such as the PCFICH (physical control format indicator channel), which indicates the number of control channel (e.g., PDCCH) OFDM symbols. In this way, it can be clearly detected which resource elements or symbols contain control channel symbols.

Figure 7:
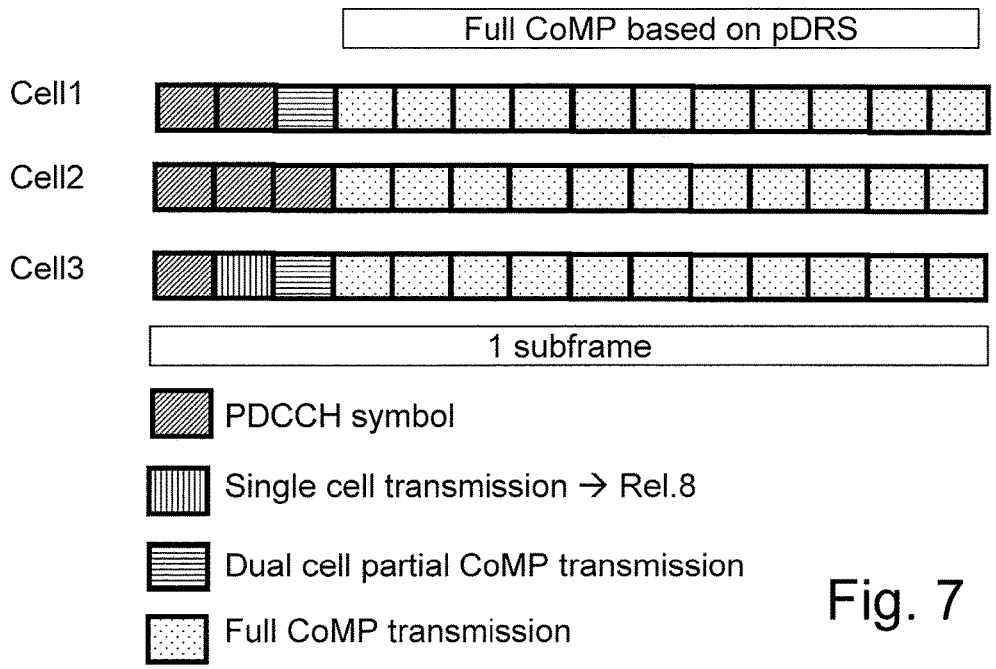
FIG. 7 illustrates PDCCH mismatch for a 3 cell CoMP transmission.

The embodiment is described in more detail by referring to FIG. 7.

In particular, in FIG. 7 the challenge regarding the mismatch of PDCCH lengths in different cooperating cells is illustrated in more detail. For the last 11 OFDM symbols cooperation is easily possible, while in the first 3 OFDM symbols one or more of the cooperating cells might be still blocked due to PDCCH transmission.

In the figure it is assumed that there is one cell with one, one cell with 2 and a third cell with 3 PDCCH OFDM symbols.

Here it is proposed to apply as much cooperation as possible, i.e. start with single cell transmission as long as all other cells are still in PDCCH mode ($2^{nd}$ OFDM symbol, vertically hatched block cell 3), and partially cooperate between cell 1 and 3 on the OFDM symbol where more than one cell does not transmit PDCCH ($3^{rd}$ OFDM symbol, horizontally hatched blocks).

Figure 8A:
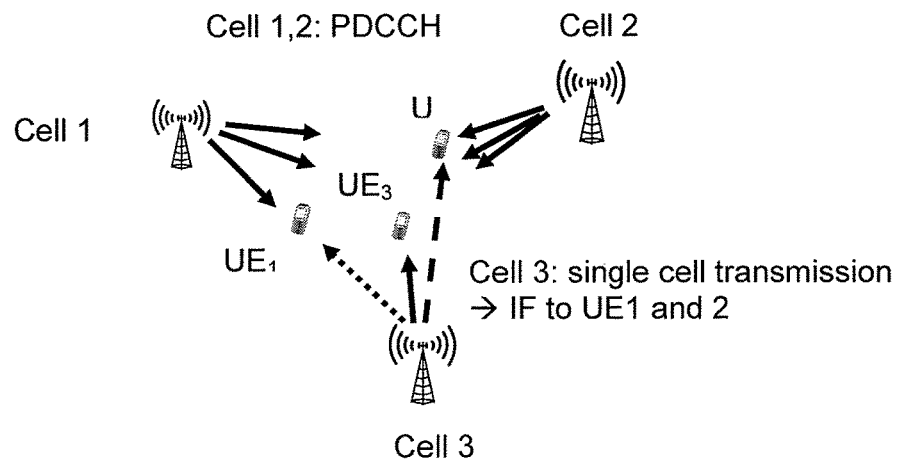
FIGS. 8A to 8C show different sizes of cooperation areas, depending on number of blocked cells due to still running PDCCH transmission in other cells according to the second embodiment.
Figure 8B:
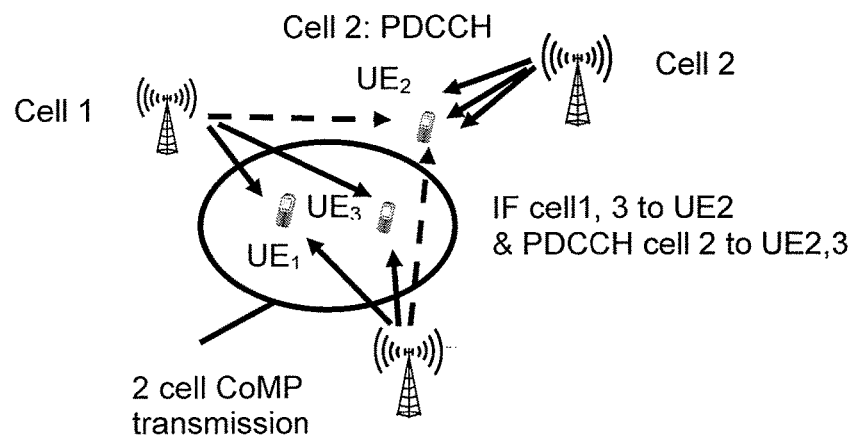
Figure 8C:
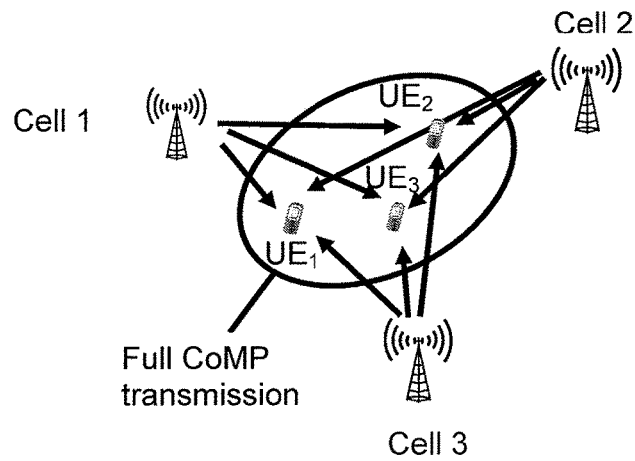

The basic concept is illustrated in FIGS. 8A to 8C, which illustrate different size of cooperation areas, depending on number of blocked cells due to still running PDCCH transmission in other cells. FIG. 8A illustrates phase 1, in which cell 1 and 2 broadcast their PDCCHs and cell 3 transmits its PDSCH. FIG. 8B illustrates phase 2 in which cell 2 and 3 start cooperation, while cell 3 finishes its PDCCH transmission, i.e. there is a 2 cell CoMP transmission. FIG. 8C shows the last phase, i.e., phase 3, in which all UEs are served cooperatively.

At a first sight this looks even more complex and seems to increase overhead for controlling further. In addition it requires different pDRS for the case of two cooperating eNBs and that of 3 cooperating eNBs, complicating everything. A deeper look on the topic reveals that the eNB can easily take care of the situation and will allow the UEs to demodulate all their PDSCH data based on the pDRS signal, independent on the number of cooperating cells. For that purpose the radio channels for the single UE UE3 are analyzed in FIGS. 9A to 9C.

FIGS. 9A to 9C show an analysis of demodulation for UE3 only for phase 1 (single cell transmission) to phase 3 (full CoMP) as described above in connection with FIGS. 8A to 8C, wherein FIG. 9A shows phase 1, FIG. 9B shows phase 2, and FIG. 9C shows phase 3. According to the figure in phase 1 the demodulation has to be done for the radio channel $h_{33}$ (single cell transmission) for phase 2 for the combined channels $h_{31}$ and $h_{33}$ and in the last phase including all radio channels $h_{31}$, $h_{32}$ and $h_{33}$.

The third phase is the conventional CoMP transmission and for demodulation the accordingly precoded pDRS are being used. With the precoding weights $w_{31}$, $w_{32}$ and $w_{33}$ the UE does its estimation based on $w_{31}*h_{31}+w_{32}*h_{32}+w_{33}*h_{33}=a*e^{j\varphi}$, a being the overall amplitude of the precoded radio channel and $\varphi$ the corresponding phase. The data signals see the same precoding as well as radio channels so that demodulation is easily possible.

In case of single cell transmission demodulation based on pDRS will fail due to channel mismatch. The PDSCH data will be send without precoding ($w_{33,single\ cell}=1$) over radio channel $h_{33}$. But one has to keep in mind that for coherent precoding the eNB has to have knowledge of all involved (virtual) radio channels based on quantized feedback of all UEs.

With the knowledge of all radio channels, the eNB can easily apply a precompensation for the PDSCH during single cell transmission by $w_{33,single\ cell,pDRS}=h_{33}/a*e^{j\varphi}$ so that UEs can directly reuse the pDRS for demodulation, independently whether the PDSCH is being transmitted from one, two or all cells. Note, precompensation weight for 2 cell transmission can be similarly derived as for single cell transmission.

Figure 10:
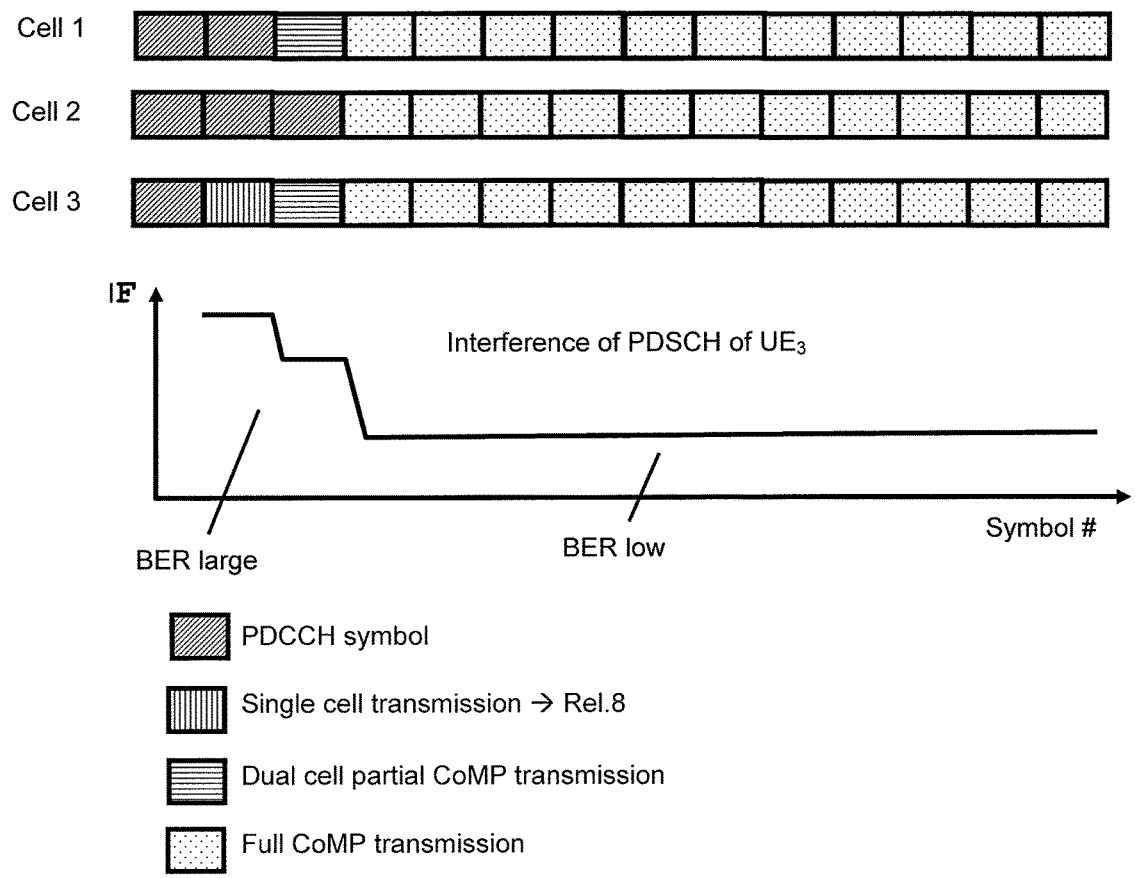
FIG. 10 illustrates varying interference and BER over one PRB due to variable number of cooperating eNBs according to the second embodiment.

During single cell transmission there is naturally more intra cooperation area interference as for the partial or full cooperation. As a result the BER (bit error rate) per symbol will vary over time. In FIG. 10 the resulting BER over the number of cooperating cells is schematically indicated with respect to the symbol number. That is, FIG. 10 illustrates the varying interference (I) and BER over one subframe due to variable number of cooperating eNBs. For that reason, according to the present embodiment it is proposed to apply corresponding interleaving to avoid burst errors. Another option would be the usage of different MCSs (modulation and coding scheme) per OFDM symbol, but this will require corresponding signalling and will therefore violate the transparency of the solution.

As a further improvement one might even think of further precompensation or cancellation of the PDCCH interference of the other cells, as these are already known to the eNB or can be estimated based on the PDCCH signals and the involved radio channels.

Thus, the present embodiment provides the following advantages:

Full flexibility is provided for the length of the PDCCHs for the different cells of the cooperation area.

All available resources can be used for PDSCH data transmission according to the PDCCH signaling of the anchor cell (as in R8).

Fully transparent solution for the UE avoiding any further control or signaling overhead.

No complex UE processing is necessary.

All complexity is shifted to eNB side. As a further solution the eNB might inform the UEs whether it is doing precompensation based on the proposed scheme or whether it is doing a more simple scheme like restricted data transmission on the last 11 OFDM symbols to avoid the processing overhead at the eNB side. This might be useful, if capacity limits are less stringent.

It is noted that in the above-described first and second embodiments, reference signals (e.g., CRS) and control channel symbols (PDCCH) were mentioned as examples for the specific element which might be contained in a resource element. However, the embodiments are not limited to these examples. That is, any kind of signal or symbol can be such a "specific element", as long as it would have a negative effect to the CoMP transmission.

Third Embodiment

The third embodiment is directed to spatial division multiplexing (SDM) for minimum overhead pDRS design, but not limited thereon. In detail, according to the third embodiment, an optimized allocation of predecoded reference signals (pDRS) for cooperative multipoint transmission (CoMP) can be achieved.

This is explained in the following in more detail, wherein at first prior art in this connection is described.

As already mentioned, for LTE Advanced the coordinated multi point transmission (CoMP) is investigated within a study item (SI) and there has been an agreed way forward, saying that there are RSs for CSI estimation (CSI-RS), which should be sparse in time and frequency as well as precoded dedicated reference signals (pDRS) for demodulation. The pDRS are for demodulation and are transmitted only on those PRBs with data transmission, saving unnecessary overhead. pDRS are precoded with the same precoder as the corresponding data signals. As pDRS will have to support demodulation of highest modulation and coding schemes (MCS) like 5/6QAM64, they will have to provide very accurate channel estimation, accompanied by corresponding large overhead for the RSs per PRB.

Another relevant issue is that LTE Advanced will support up to 8 Tx antennas per cell and in case of CoMP systems easily 5 or even more cells might cooperate. From a channel estimation perspective that means that in case of a straight forward implementation 5×8=40 channels would have to be estimated, which is beyond the UE capabilities and in addition leads to extremely high channel estimation and reference signal overhead, specifically for the pDRS.

pDRS and data are precoded by the same CoMP precoder so that the precoding is transparent to the UEs, meaning they do not have to know the precoder for demodulation. Currently, this type of transparency is favoured.

The pDRS will provide very good estimation accuracy based on sufficient resources for the pDRSs. pDRS, if used for coherent precoding, will benefit from beamforming gains and there will be required orthogonal precoded RSs per stream or UE. Orthogonalisation might be done in time-, frequency- or code domain (TDM/FDM or CDM). In case e.g. of a cooperation area of 5 cells which support 4 UEs with one stream each, than there will be a minimum of 4 orthogonal pDRS. Each pDRS might be supported by about 4-6 resource elements. In case of 4 to 8 Tx antennas overhead for pDRS increases easily to 20-30% per scheduled PRB. As CoMP is intended for overload conditions, it easily might be that 80% of UEs are in CoMP mode, i.e the overall overhead for pDRS will be reduced only marginally by about 20%.

The additional RSs (aRS)—also called CSI-RS—are intended for CSI estimation. The CSI estimates will be fed back by the UEs to the eNBs so that these can apply proper precoding.

CSI-RS density has to be adapted to coherence time and frequency selectivity of the radio channels as well as has to sufficiently suppress multi cell RS interference. Required performance of CSI estimation has to match intended precoding accuracy and is therefore dependent on the overall precoding scheme. Simulations of single cooperation areas show that mean square errors MSE in the range of 0.1 to 0.01 will be required for advanced coherent precoding schemes, leading easily to additional CSI RS overhead of some 10%.

For CRS like CSI-RSs all UEs can use the same CSI-RSs for channel estimation, so that overall overhead is independent on the number of UEs. At the same time for CoMP in combination with 8 Tx antennas and e.g. 5 cells CSI RS overhead will easily explode.

From the way forward there seems to be two possible directions for minimizing overall RS overhead, i.e. i) minimizing overhead for CSI RS or ii) doing the same for pDRS.

It is noted that according to the present embodiment, the second direction is taken, i.e. according to the embodiment, the pDRS overhead for coherent precoding CoMP solutions is to be significantly minimized without sacrificing performance under the assumption of accurate channel estimation based on CSI-RSs.

For the provision of orthogonal pDRS, currently many different variations of TDM/FDM and CDM allocations of RSs per PRB are investigated.

Most recently it has been proposed to allow for channel estimation based on pDRS over several subframes or PRBs, if otherwise overhead is getting to high. This would spread overhead over several PRBs allowing thinning out number of RSs per PRB.

The goal of the present embodiment is, but not limited thereto, to significantly reduce pDRS overhead for coherent precoding solutions, even in case of large number of cooperating enhanced Node Bs (eNB).

Figure 11A:
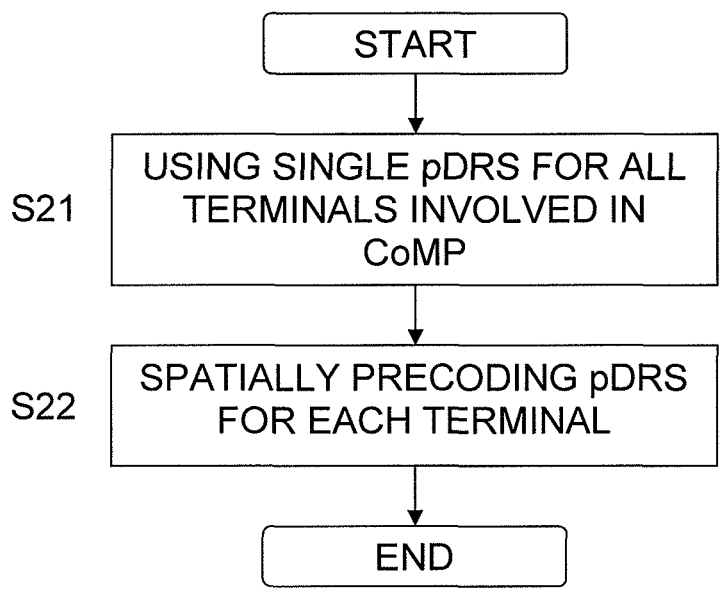
FIG. 11A shows a method according to a third embodiment.

A method according to a general example of the present embodiment is described in the following by referring to FIG. 11A and FIG. 11B. FIG. 11A illustrates a method according to the general example of the present embodiment. The method controls transmitting of reference signals in resource elements of a resource block in a coordinated multipoint transmission between network control elements and terminals. In step S21, for a sequence of reference signals, a single reference signal (e.g., pDRS) for all terminals is used, wherein in step S22, this single reference signal is spatially precoded for each terminal.

Figure 11B:
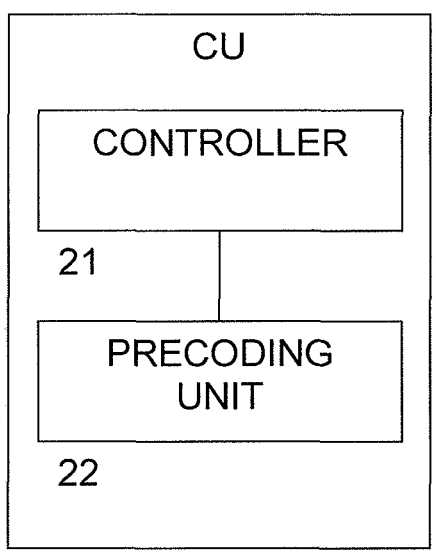
FIG. 11B shows an apparatus according to the third embodiment.

FIG. 11B shows an apparatus according to a general example of the present embodiment. The apparatus may be or may be part of a network control element such as a central unit (CU) or NodeB (or eNodeB). In the example of FIG. 6B, the apparatus is part of the central unit. The apparatus comprises a controller 21 which is configured to control transmitting of reference signals (e.g., pDRS) in resource elements of a resource block in a coordinated multipoint transmission between network control elements and terminals, and to use, for a sequence of reference signals, a single reference signal for all terminals. Furthermore, the apparatus comprises a precoding unit 22 which is configured to spatially precode the single reference signal for each terminal.

Thus, pDRS in a sequence of reference signals over several subframes are used for demodulation only with spatial precoding.

Hence, the pDRS overhead can be lowered significantly.

It is noted that the transmission controller 21 and the precoding unit 22 may be provided as one unit. That is, for example a processor of the CU or an eNode-B (not shown) may be configured to perform the functions of these elements.

Preferably, according to the embodiment in a first subframe orthogonal reference signals (e.g., pDRS) may be used, so that, in case no perfect precoding is possible, an estimation of interference can be allowed.

Thus, according to the present embodiment, instead of orthogonal pilots for every UE, spatial precoding for the pDRS (beamforming to the UE) is used. That is, the first pDRS of a sequence may be orthogonal to allow estimation of interference etc., and the following pDRS in the sequence are used for demodulation only (with spatial precoding). Hence, the pDRS overhead can be significantly reduced.

In more detail, according to the present embodiment, cooperative UEs are scheduled over several subframes on the same PRBs. That is, according to the embodiment, instead of thinning out the REs for pDRS per PRB it is proposed to have firstly a PRB with pDRS for all spatial layers available. This allows for accurate channel estimation for the first subframe and will provide high CoMP gains.

In the following subframes, the specific characteristics of coherently precoded cooperation is exploited, i.e. that in case of ZF (zero forcing) like precoding all interference within the cooperation will be cancelled or at least reduced to a predefined value. For that reason the demodulation reference signals do not have to be orthogonalized by TDM, FDM or CDM, but one single set of pDRS can be reused for all UEs by applying spatial division multiplexing (SDM).

This reduces overhead for the pDRS from e.g. 5 or more streams to that of a single stream. In principle, the already standardized AP5 from LTE Rel. 8 might be reused for this purpose.

In case of perfect precoding the first subframe carrying orthogonal pDRS per stream or UE could be avoided as well and SDM might be applied just from the beginning, reducing overhead further.

Going into the other direction one might add some further LTE Advanced pDRS PRBs from time to time to make the system more robust or to take care of strong channel variations for estimation of inter stream interference. This could be configurable e.g. by eNB and possibly by higher layer signaling. UE transparent solutions might be possible, if SDM is continuously running and the added pDRS are on other REs.

Further alternatively, pDRS may only be used on some resource elements. That is, orthogonal reference signals may be transmitted only for one or two interfering streams. Such a scheme allows sending only for few streams additional orthogonal RSs based on TDM, FDM or CDM, so that the UEs can learn over several subframes all inter stream interference. In this way, overhead can still be minimized, but on the other hand, the robustness of the transmission is improved.

Figure 12:
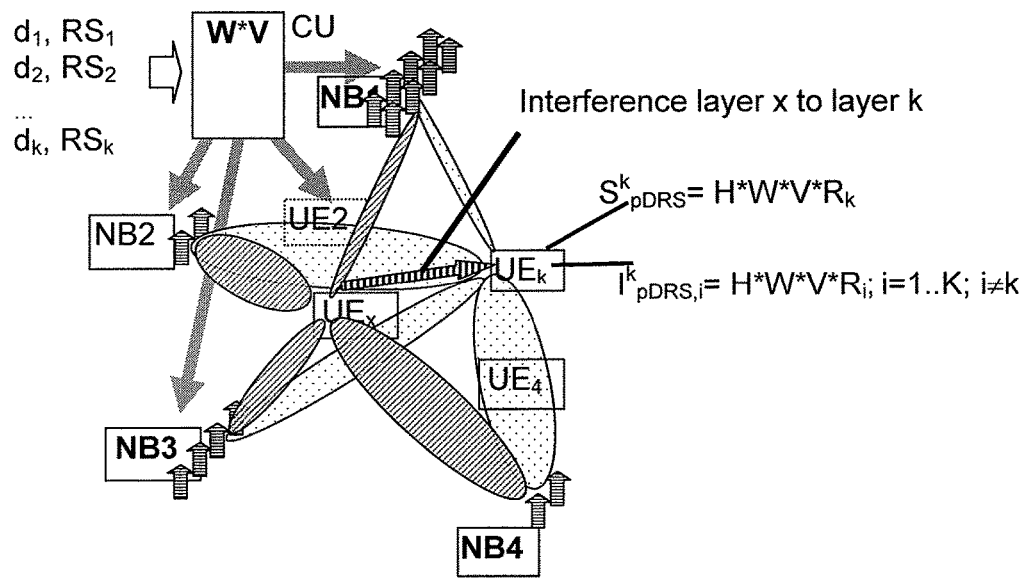
FIG. 12 illustrates a CoMP area with 4 eNBs, having different numbers of antenna elements in connection with the third and the fourth embodiment.

FIG. 12 shows the basic concept for SDM multiplexing of pDRS for the cooperating UEs according to the present embodiment by illustrating a CoMP area with 4 eNBs. The transmission of one coherently precoded spatial layer x to $UE_x$ (indicated by diagonal hatching) and its interference to $UE_k$ (indicated by dotted hatching) is illustrated schematically.

First, the symbols used in connection with FIG. 12 and in the present embodiment are shortly described:

K: # of streams or UEs for one stream per UE k: UE index; k ∈ 1 . . . K $V_{nc \times nt}$: precoder for virtual antennas $W_{ntv \times k}$: precoding matrix $H_{k \times ntv}$: channel matrix P: precoding correction matrix $RS_i$: reference signals for spatial layer i.

FIG. 12 shows a central unit (CU) (in which the function of a precoding unit is indicated by W*V), to which several reference signals ($RS_1$, $RS_2$, . . . $RS_k$) and data signals ($d_1$, $d_2$, . . . $d_k$) are provided. From the CU, the different signals are sent to the different NodeBs which are indicated by $NB_1$ to $NB_4$, which comprise different numbers of antenna elements (indicated by arrows hatched with horizontal lines), respectively. These serve several UEs in the area, which are indicated by $UE_2$, $UE_4$, $UE_k$ and $UE_x$.

It is noted that the arrow hatched with vertical lines indicates interference from layer x to layer k, wherein layer x indicates the connections between the NodeBs and $UE_x$, and layer k indicates the connection between the NodeBs and $UE_k$.

In the following, the pDRS CSI estimation procedure according to the present embodiment is summarized by referring to FIG. 12:

Interference from other UEs ($I^k_{pDRS,i}$) is assumed to be zero or very low due to almost perfect precoding with W*V.

In case that there is some residual interference, the first PRB of a sequence of PRBs is being used to estimate these interference and e.g. adapt the minimum mean square error (MMSE) receiver to minimize inter stream interference.

The MMSE receiver will be kept constant for the whole transmission time of this PRB train.

For the following PRBs the UEs are served with the same cell specific pDRS $R_1=R_i=R_K$ for all spatial streams, but with different spatial precoding. For that purpose the RSs and data for each UE use the same precoder W*V.

In case of perfect precoding, UE receive their demodulation pDRS without interference from other UEs without the need for several REs as in case of TDM, FDM or CDM.

According to an intermediate solution, every xth subframe there is one (or more) additional orthogonal (TDM,FDM,CDM) pDRS signal for one (or several) data streams. By changing the stream for which the orthogonal pDRS are sent, the UEs can learn over time the full interference from other data streams. It allows for a trade off between robustness (adapt MMSE UE beamformer) and overhead.

It is noted that the application of SDM for the pDRS is in line with the way forward for LTE Advanced as the pDRS are intended for demodulation only. Orthogonal per stream pDRS would allow estimating interference at UEs and learning more about the overall radio channel conditions, but as this information is not being used it does not make sense to spend any overhead for this.

Hence, the third embodiment provides the following advantages:

The proposed solution significantly reduces pDRS overhead for coherent precoding CoMP solutions, which are seen as the most promising candidate for high performance.

Overhead of pDRS has been calculated to be easily in the range of 20 to 30%, which is a real burden for effective CoMP solutions. By application of the SDM proposal this can be reduced to a few percent, similar as for AP5 in LTE Rel. 8.

The solution is very simple to implement and might be fully transparent to the UEs.

If SDM is applied throughout the whole time, AP5 might be reused for this solution avoiding any need for further standardization. Hence, the solution can be implemented easily.

For a more robust and flexible design interference aware PRBs might be combined with those where SDM is being used, allowing for a trade off between overhead and robustness as well as maybe performance.

In case the first PRB uses orthogonal pDRS, the overall overhead reduces with the length of the PRB trains per UE. It is assumed that typically cooperating UEs have large amounts of data to transmit and therefore such trains can easily be generated.

Inter stream interference due to predcoding errors will reduce demodulation performance. These errors will increase over time and with increasing mobile speed. It has to be noted that this is similar as performance degradations known for CDM inter code interference. In addition the precoding errors for the pDRSs will be exactly the same as for the data transmission. In that sense, the concept according to the present embodiment is self scaling, i.e. precoding accuracy and that required for channel estimation for the purpose of demodulation will have the same level.

Fourth Embodiment

The fourth embodiment is directed to an integrated reference signal (RS) design for LTE Advanced and CoMP. In particular, according to the fourth embodiment, overhead for reference signals for channel state information (CSI-RS) for cooperative multipoint transmission (CoMP) in LTE-A is reduced.

This is explained in the following in more detail, starting with a description of some prior art in this connection.

As already described above, the Coordinated multi point transmission (CoMP) is currently investigated, and there has been an agreed way forward, saying that there are RSs for CSI estimation (CSI-RS), which should be sparse in time and frequency as well as precoded dedicated reference signals (pDRS) for demodulation. The pDRS are for demodulation and are transmitted only on those PRBs with data transmission, saving unnecessary overhead. pDRS are precoded with the same precoder as the corresponding data signals, so that the precoding is transparent to the UEs, meaning they do not have to know the precoder for demodulation. As pDRS will have to support demodulation of highest modulation and coding schemes (MCS) like 5/6QAM64, they will have to provide very accurate channel estimation, accompanied by corresponding large overhead for the RSs per PRB.

Moreover, as already mentioned with respect to the third embodiment, LTE Advanced will support up to 8 Tx antennas per cell and in case of CoMP systems easily 5 or even more cells might cooperate, so that up to 5×8=40 channels would have to be estimated.

Another issue complicating things further is that in cellular radio systems like LTE or LTE Advanced multi cell interference reduces CSI estimation performance significantly, requiring effective orthogonalisation between cells for example by applying cell specific CDM sequences. This increases RS overhead further.

As already mentioned above in connection with the first to third embodiments, backward compatibility of LTE Advance with Release 8 should be achieved. For Release 8 the common reference signals (CRS) have been defined, leading to an overhead of 10/15% for 2/4-antenna configurations. It is common understanding that these CRSs—at least for antenna ports AP0 and 1—will have to be transmitted continuously for full backward compatibility.

The pDRS will provide very good estimation accuracy based on sufficient resources for the pDRSs. pDRS if used for coherent precoding will benefit from beamforming gains and there will be orthogonal precoded RSs per stream or UE. Orthogonalisation might be done in time-, frequency- or code domain (TDM/FDM or CDM). In case e.g. of a cooperation area of 5 cells which support 4 UEs with one stream each, than there will be a minimum of 4 orthogonal pDRS. Each pDRS might be supported by about 4-6 resource elements. So overall overhead increases easily to 20-30% per scheduled PRB.

The additional RSs (aRS)—also called CSI-RS—are intended for CSI estimation. The CSI estimates will be fed back by the UEs to the eNBs so that these can apply proper precoding. CSI-RS density has to be adapted to coherence time and frequency selectivity of the radio channels as well as has to sufficiently suppress multi cell RS interference. Required performance of CSI estimation has to match intended precoding accuracy and is therefore dependent on the overall precoding scheme. Simulations of single cooperation areas show that mean square errors MSE in the range of 0.1 to 0.01 will be required for advanced coherent precoding schemes, leading easily to additional CSI RS overhead of some 10%.

General the advantage of CRS like CSI-RSs is that all UEs can use the same CSI-RSs for channel estimation so that overall overhead is independent on the number of UEs. At the same time for CoMP in combination with 8 Tx antennas and e.g. 5 cells CSI RS overhead will explode.

From the way forward it is not clear yet what is the meaning of sparse in time and frequency, but initial simulations with the KORAK simulator indicate that CSI-RSs providing one value per physical resource block (PRB) and about 2 subframes with CSI RSs per frame a 10 ms seems to be possible. Note one frame consists of 10 subframes a 1 ms.

Further well known technique is to apply virtual antennas on top of several physical antennas, typically combined with cyclic delay diversity (CDD) as diversity scheme, avoiding beamforming effects for broadcast signals like the CRSs. While diversity might be gained, some spatial degree of freedom—specifically in case of 8 Tx antennas—will be lost, which might be used to increase overall system performance.

The goal of the present embodiment is to provide an integrated solution with maximum performance and simultaneously minimum overall RS overhead for LTE Advanced.

Thus, according to the present embodiment, it is desireable to minimize overall RS overhead for advanced CoMP solutions like coherent precoding and to find an integrated solution allowing for highest performance at the same time. Optimum would be an overall overhead for CRS, CSI-RSs plus pDRS in the order of 15-20%. Higher overhead is expected to result in significant difficulties to provide the intended large systems gains, as CoMP gains have to overcome the additional RS overhead and in addition will restrict CoMP gains to a smaller part of the overall transmission time.

Figure 13A:
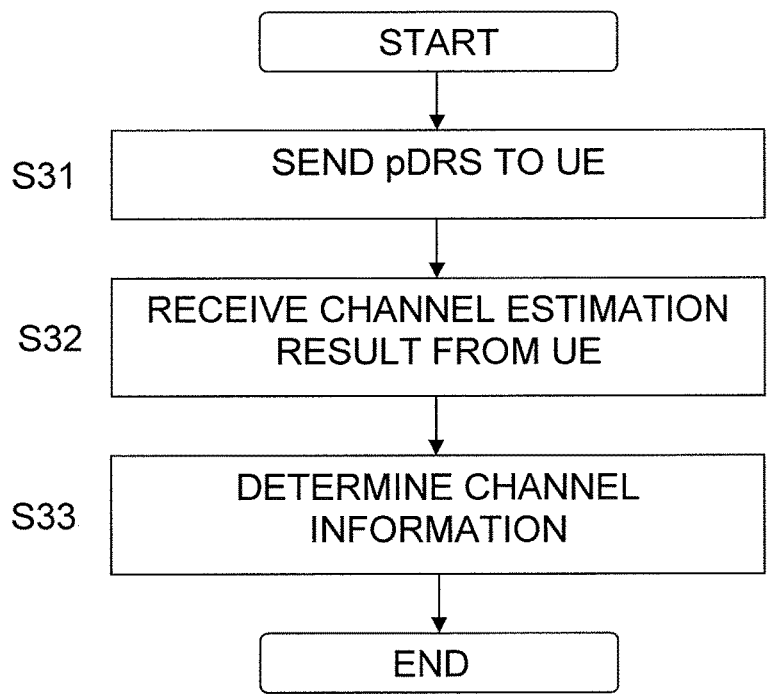
FIGS. 13A and 13B show methods according to a fourth embodiment.

More specifically, the following goals should be achieved:
Rel 8 backward compatible
  contineous transmission of Rel.8 CRSs
Take care of Way forward 'sparse CRS+accurate pDRS'
Coherent precoding requires accurate FB
  accurate multi cell CSI
Typically CoMP should support 1 to 2 spatial layers, even in case of 8 Tx
Maximize CSI estimator gain
  exploit all RSs for CSI estimation
CoMP system for cells with different numbers of antenna elements per eNB According to a general example of the present embodiment, a method, which may be carried out by a network control element such as an eNodeB is provided as illustrated in FIG. 13A. In particular, in step S31, an orthogonal precoded dedicated reference signal (e.g., pDRS) is sent to a terminal. In step S32 a channel estimation result is received, which is established by the terminal using the orthogonal precoded dedicated reference signal, and in step S33 channel information is determined based on the received channel estimation result.

Figure 13B:
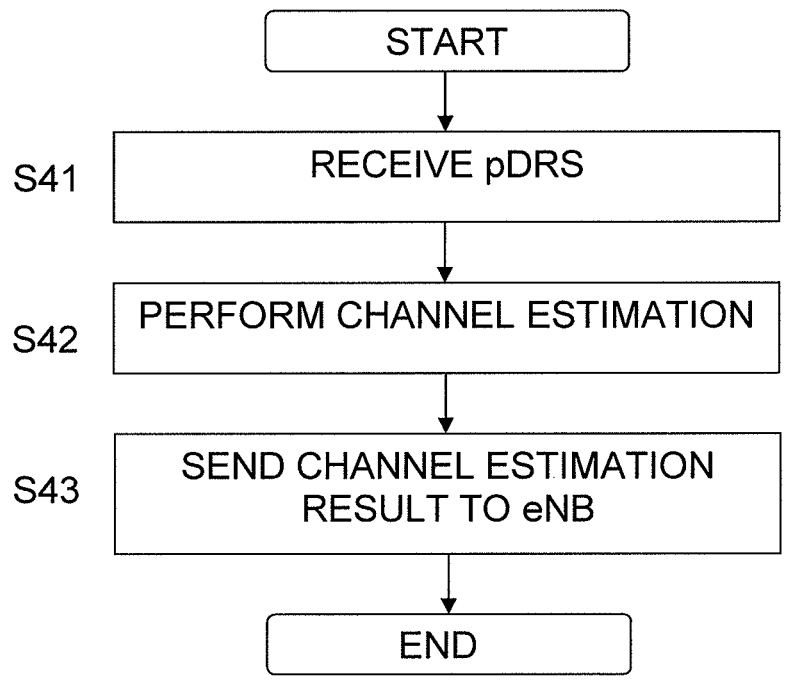

According to the general example of the present embodiment, a further method, which may be carried out by a terminal such as a user equipment (UE) is shown in FIG. 13B. In step S41, an orthogonal precoded dedicated reference signal is received, in step S42, a channel estimation is performed using the orthogonal precoded dedicated reference signal, and in step S43, the channel estimation result is sent to a network control element.

Figures 14A, 14B:
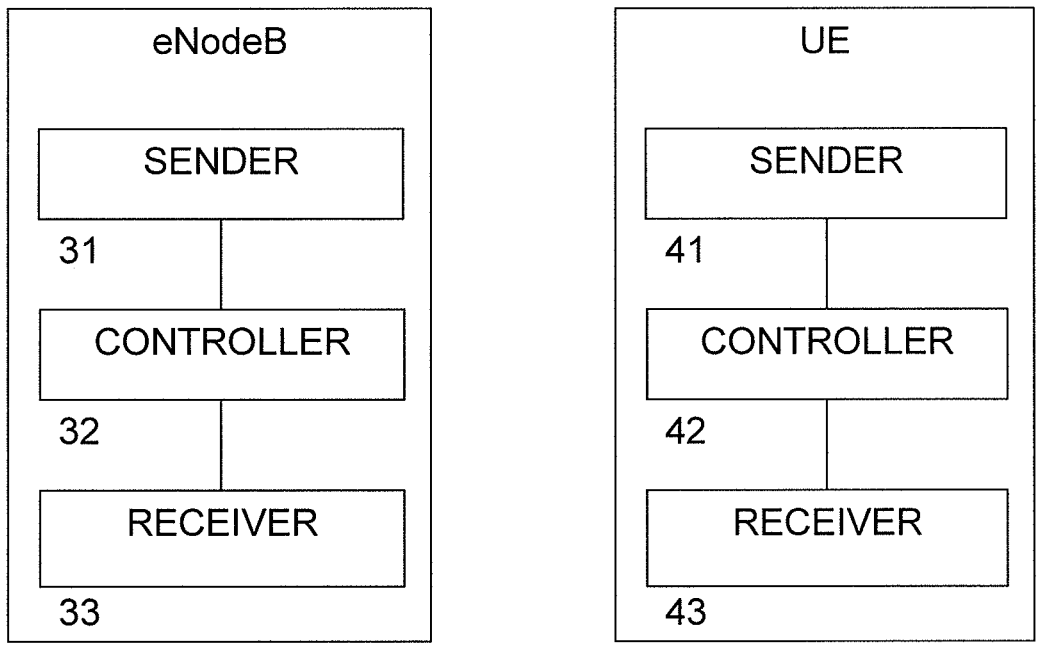
FIGS. 14A and 14B show apparatuses according to the fourth embodiment.

FIG. 14A shows an apparatus, which may be a network control element such as an eNodeB, according to the general example of the present embodiment. The apparatus comprises a sender 31, which sends an orthogonal precoded dedicated reference signal to a terminal. Moreover, a receiver 33 receives a channel estimation result, which is estimated by the terminal using the orthogonal precoded dedicated reference signal. Furthermore, the apparatus comprises a controller 32 which determine channel information based on the received channel estimation result.

FIG. 14B shows an apparatus, which may be a terminal such as a user equipment (UE), according to the general example of the present embodiment. The apparatus comprises a receiver 43 which receives an orthogonal precoded dedicated reference signal, a controller 42 which performs a channel estimation using the orthogonal precoded dedicated reference signal, and a sender 41 which sends a channel estimation result to a network control element.

It is noted that in both apparatuses, the sender 31 (or 41), the controller 32 (or 42) and the receiver 33 (or 43) may be provided as one unit. That is, for example a processor of a CU or an eNode-B or of a UE may be configured to perform the functions of these elements or a part thereof.

That is, the network control element transmits an orthogonal precoded dedicated reference signal (e.g., pDRS) to the terminal, the terminal estimates the channel (or the received signals) based on this orthogonal precoded dedicated reference signal, sends the result back to the network control element, which in turn calculates the channel.

Hence, the channel estimation is performed based on the orthogonal precoded dedicated reference signal, which is intended, according to present standard, for demodulation only. Thus, channel estimation can be effected by a reference signal which is to be used for demodulation, so that CRS signals, which are conventionally used for channel state estimation, can be largely reduced. Therefore, the overhead can be reduced.

Thus, according to the present embodiment all available CSI estimations from CRS, CSI-RS and pDRS can be combined as far as possible and a double overhead for channel estimation based on CSI-RSs and for demodulation based on pDRS can be avoided.

a) CRSs cannot be fully avoided due to backward compatibility to Rel. 8. To minimize their overhead it is proposed to use only CRS for AP0 and 1 and apply antenna virtualization in case of more than two APs. This can be seen as state of the art, but minimizes the unavoidable overhead for CRS to about 10%. In case of only AP0 further minimization to about 5% would be possible, but this might limit Rel.8 UE performance, where as baseline a 2×2 system is assumed.

b) As pDRS will provide significant overhead in case good demodulation accuracy should be achieved the additional overhead for CSI-RSs has to be minimized. For that reason it is proposed to provide CSI-RS very sparse in time and sparse in frequency. Very sparse in time means that there will be e.g. only one single LTE Advanced subframe per frame, leading already to significant performance limitations for coherent precoding due to time variance of the radio channel. Sparse in frequency means e.g. only one estimation location in frequency direction per PRB (one CSI-RS every 12 SC). This will fit to expected feedback limitations with one feedback per PRB.

As LTE Advanced subframes are very sparse in time quite high number of CSI RSs per LTE-Advanced subframe are possible, providing good CSI estimation accuracy and multi cell orthogonalization by corresponding cell specific CDM sequences. This provides once per frame a very accurate CSI estimation.

c) pDRS are used for demodulation as being described in the way forward for the LTE Advanced study item. In case of 8 Tx antenna MIMO transmission up to 8 orthogonal pDRS will have to be provided by corresponding TDM/FDM and/or CDM. From CoMP point of view optimum would be a scaling of the orthogonal pDRS patterns to the number of streams on air, which will be typically only 3-5 streams as in case of CoMP most UEs are served with one ore more seldom with two data streams and typical size of cooperation areas is about 5, i.e., 5 cells cooperate.

d) For adaptation of the number (#) of physical antenna elements within the cooperation area (might be several tenth in the longer run) and the number (#) of data streams on air (about 3-5 as explained above) a CoMP friendly antenna virtualization concept is required, exploiting the spatial degree of freedom (SDF) as far as possible. In the most simple case CDD might be used as virtualization technique, but this might have two disadvantages: i) the SDF is lost due to diversity effects of CDD and ii) CDD will increase the frequency selectivity. Higher frequency selectivity is unwanted for CoMP as it will lead to more CSI estimation effort, more feedback and makes it more difficult to exploit frequency selective multi user (MU) scheduling gains.

d) In case of CoMP coordinated beamforming is seen as a valuable means to reduce inter cooperation interference. Selection of appropriate beams requires the knowledge of the individual radio channels for each UE to each eNB antenna. At the same time the beam selection can be done semi statically. For that reason every $n^{th}$ frame a LTE Advanced frame with antenna specific CSI-RS should be provided allowing selection of appropriate beam patterns. In the intermediate LTE Advanced subframes (e.g. every frame) CSI RSs will be restricted to selected beams. In case of eNBs with 8 Tx antennas a factor of 8 might be saved.

e) As each cooperation area will require its own set of preselected beams, typically beams will have to be changed over time and frequency and eNBs have to assure that UEs are scheduled on their respective resources. Otherwise there have to be CSI-RSs per beam so that each UE can estimate its radio channels for the relevant beams.

f) As seen above, antenna virtualization reduces either SDF or coordinated beamforming generates quite some CSI estimation overhead. In addition typically for coherent precoding there should be some Tx diversity included avoiding power rising for ZF solutions. As an example a cooperation area of size 5 should serve typically less than 4 UEs. As a result there is even in case of virtual antennas a mismatch between number of spatial streams on air (e.g. 4) and number of virtual radio channels (e.g. 10). In addition the CSI RS overhead will be there independent of the number of UEs really in CoMP mode.

As we assume transparent precoding solutions, it might be possible that the UEs cannot directly estimate all radio channels based on the pDRS signals. However, it is again referred to FIG. 12 described above in connection with the third embodiment. According to FIG. 12, it is derivable that the UEs can estimate—for orthogonal pDRS per stream—beside their own signal the inter stream interference due to precoding errors. As being explained in more detail below, the eNBs can use this feedback to update their precoding matrix, thereby cancelling the residual interference. In addition the eNBs of the cooperation can reconstruct the radio channels based on their knowledge of the original precoding matrix as being illustrated in FIG. 15.

In the following, the pDRS CSI estimation procedure according to the present embodiment is described.

The definition of the variable is explained first (see also the description of FIG. 12 given in connection with the third embodiment).

K: # of streams or UEs for one stream per UE k: UE index; k ∈ 1 ... K $V_{nc \times nt}$: precoder for virtual antennas $W_{ntv \times k}$: precoding matrix $H_{k \times ntv}$: channel matrix P: precoding correction matrix $RS_i$: reference signals for spatial layer i.

The pDRS CSI estimation procedure according to a specific example of the present embodiment is as follows:

eNBs transmit orthogonal pDRS Ri to each active UE with precoder W*V over channel matrix H: H*W*V*Ri Each UE k estimates received signals of its own channel ($S^{'k}_{pDRS}$) and interference from other UEs $UE_i$ ($I^{'k}_{pDRS,i}$) based on Ri UE feeds back quantized values of estimates $S^{'k}_{pDRS}$ and $I^{'k}_{pDRS,i}$ by $ePMI_{i,k}$ eNB combines feedback of all UEs $ePMI_{i,k}$ to the new matrix $(H*W*V)'_{pDRS}$ and calculates precoding correction matrix P:

for ZF P=pinv $((H*W*V)'_{pDRS})$.

eNBs use for further transmissions H*W*V*P instead of H*W*V

Alternatively, eNB extracts $H'_{pDRs}$ by $H'_{pDRS}=(H*W*V)'_{pDRS}/W$. This allows for flexible combining with other UEs This is described in the following by referring to FIG. 15, which illustrates the integrated RS scheme according to the fourth embodiment. In the top of the figure, ten subframes, subframe 1 to subframe 10 are shown, wherein only in subframe 1 aRS and CRS are broadcasted.

Figure 15:
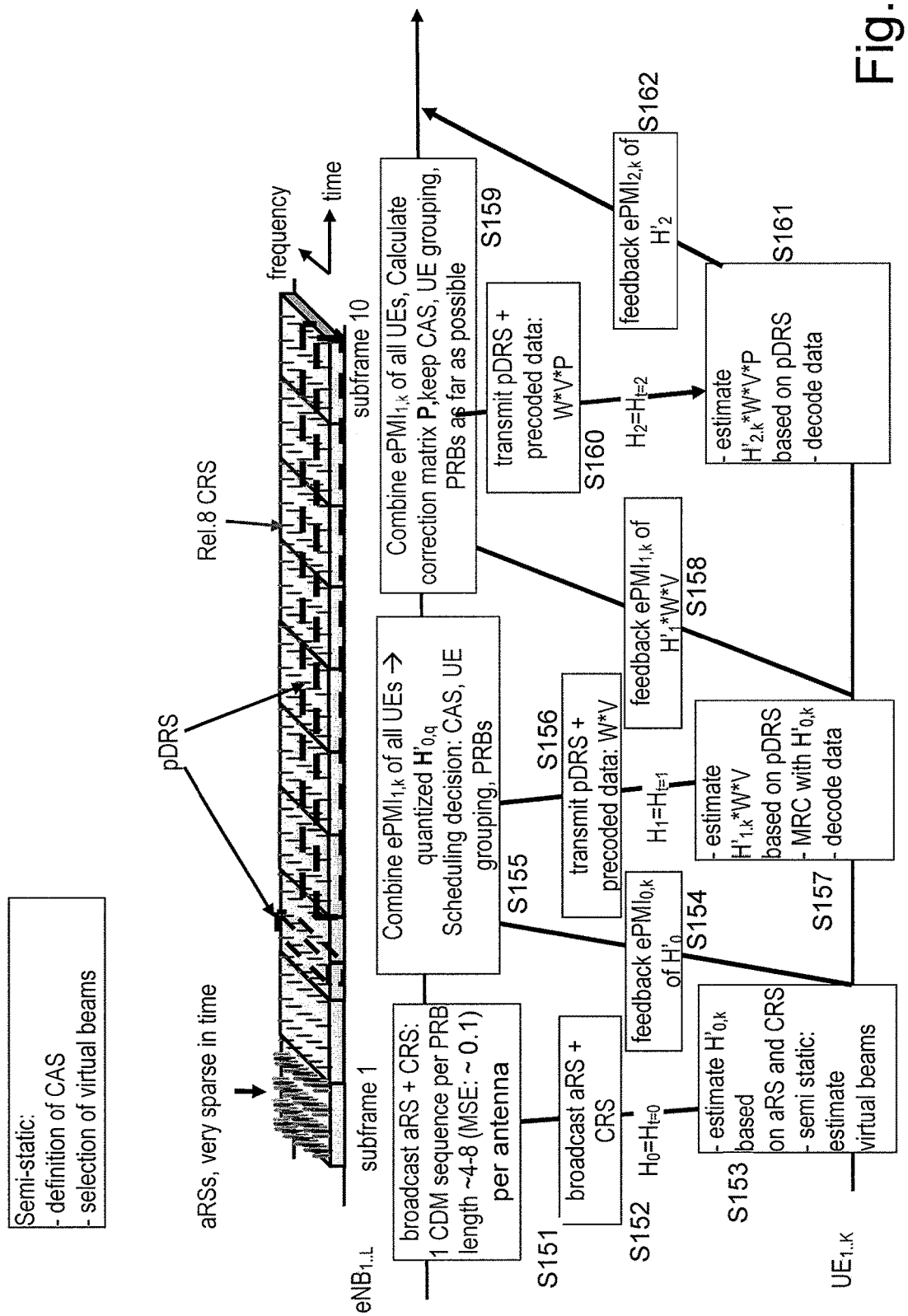
FIG. 15 illustrates an integrated RS scheme according to the fourth embodiment.

In the lower half of FIG. 15, a process sequence between eNodeBs (eNB1 . . L) and the UEs (UE1 . . k) is shown. In step S1, the broadast of ARS and CRS is prepared, wherein 1 CDM sequence per PRB lenthg is used, which corresponds to 4 to 8 (MSE: ~0.1) per antenna. In step S152, aRS and CRS is broadcast. In step S153, the UE estimates the channel matrix $H'_{0,k}$, based on aRS and CRS. Based on $H'_0$, ePMI0,k is generated and fed back to the eNodeB in step S154. In step S155, the eNodeB combines $ePMI_{1,k}$ of all UES, so that a quantized H'0,q is obtained. Furthermore, a scheduling decision is taken with respect to CAS, UE grouping and PRBs based on the results.

In step S156, the eNodeB transmits pDRS and precoded data: W*V to the UE. In step S157, the UE estimates $H'_{1,k}$*W*V based on pDRS, determines MRC with $H'_{0,k}$ and decodes data. The UE determines $ePMI_{1,k}$ of $H'_1$+W*V and transmits this to the eNodeB in step S158.

In step S159, the eNodeB combines $ePMI_{1,k}$ of all UEs, calculates the correction matrix P, and keeps CAS, UE grouping, and PRBS as far as possible. In step S160, the eNodeB transmits pDRS and precoded data: W*V*P to the UE.

The UE estimates $H'_{2,k}$*W*V*P based on pDRS and decodes data in step S161, and feedbacks $ePMI_{2,k}$ of $H'_2$ to the eNodeB in step S162. After this, the processes of steps S159 to S162 can be repeated.

As an option, it is also possible to send sometimes pDRS on resource elements currently not scheduled in order to allow for sounding these radio channels for future scheduling decisions (also referred to as "wideband sounding").

The pDRS sent in this way are indicated in the figure by dashed boxes.

As a result the following main items of the specific example of present embodiment described above can be described as follows:
 Use of very sparse instead of sparse CSI-RS in time, providing only a seldom—but accurate—CSI estimate, which will be typically outdated very soon. This one is used to allow for a first scheduling decision as well as a first more or less accurate precoding, while overall contribution to RS overhead will be at few percent.
 Use pDRS not only—as described in the way forward—for demodulation, but also as specific feedback, allowing the eNBs to either adapt their precoders or even to reconstruct the main (virtual) radio channels. In the first case the same cooperation has to be continued, while in the second case a new grouping of users is possible.
 As pDRS feedback will be intermittently and not on all PRBs
 depending on current scheduling decisions—the eNBs collect all available information and use always the most accurate and most recent CSI information for calculation the precoding matrix. As a starting point the precoding is based on the CSI RS estimates and with each pDRS feedback the precoding will be improved accordingly. This solution is at the same time robust as well as exploits all RS signal energy on air to statistically maximize performance.
 In addition there might be semi statically LTE advanced subframes allowing full CSI estimation to all physical antenna elements, which is relevant if eNBs have 4 and more antenna elements.

Figure 16:
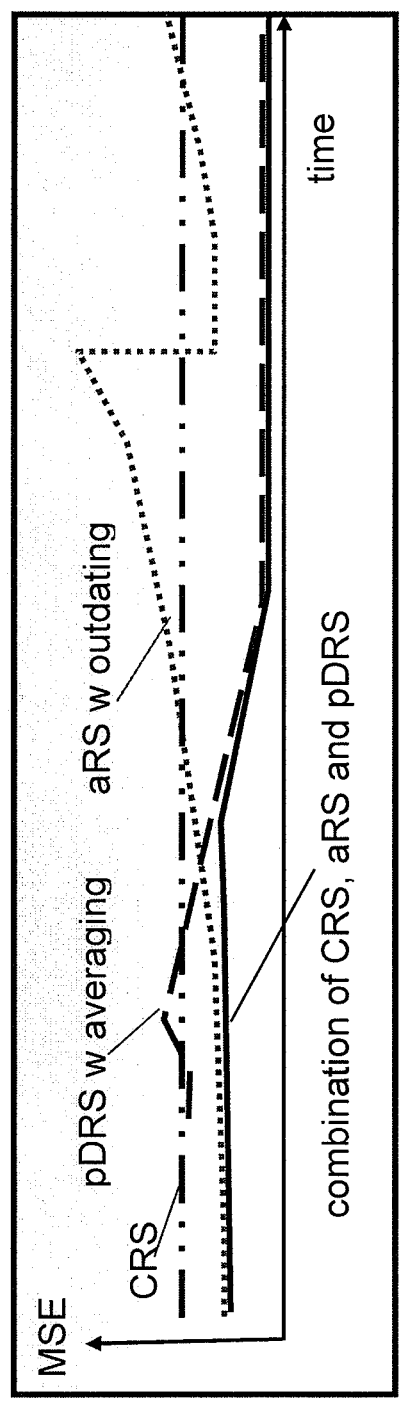
FIG. 16 illustrates typical characteristics of CSI estimation accuracy of CRSs, CSI-RS and pDRS as well as the result of possible combining gains when applying the procedure according to the fourth embodiment.

In the following typical characteristics of CRS, CSI-RSs and pDRS are listed:
 CRS:
 CRS are mainly for support of Rel. 8 UEs
 To minimize overall overhead target configuration for Rel. 8 should be for 2×2 systems (about 10% overhead).
 To exploit all RS power MRC with aRS and pDRS estimations should be considered.
 Frequency shifting within possible CAS should be avoided by proper selection of cell IDs.
 aRS:
 aRSs allow for accurate CSI per antenna element (8 Tx requirement), e.g. once per frame
  allows for selection of best suited virtual precoder (semi static)
 CDM on top of aRS minimize multi cell channel interference
 For MSE<0.1 . . . 0.01 CDM length should be in order of 4 to 8
 Feedback granularity >=1PRB
  one value per antenna and PRB sufficient
  aRS more sparse in frequency than Rel. 8 CRSs
 UEs calculate first channel estimates for virtual antennas and feed back PMIs per virtual AE
 eNBs use PMIs for scheduling decisions and calculation of precoding matrix W
 pDRS:
 UEs use pDRS for demodulation
 pDRS have to support largest MCS→MSE in order of 0.01
 pDRS are orthogonal per stream (UE)→each UE can estimate own as well as all interfering streams
 Max # of streams in order 5 and more for future proof design
  update PMIs or send additional PMIs based on pDRS estimations
 eNB combines feedback from all UEs to calculate correction precoding matrix P
 pDRS exploit beamforming gain and interpolation over time→beamforming estimator gain
 Inter CAS interference of pDRS have to be orthogonal→WH sequence over×slots/subframes FIG. 16 illustrates typical characteristics of CSI estimation accuracy of CRSs, CSI-RS and pDRS as well as the result of possible combining gains. In detail, FIG. 16 compares the different characteristics in terms of achievable MSE for CRS, CSI-RS and pDRS. Best performance should be possible based on pDRS due to their low MSE of about 0.01 (required for demodulation of highest MCS). At the same time pDRS will be send only if there are data for a specific UE. In addition there will be pDRS only on those PRBs where the UEs have been scheduled.

In the following, the main goals as described above in connection with FIG. 16 are summarized:
 MSE of CRS: about 0.1
 MSE of aRS: <0.1 (ideally 0.01, depends on CDM length)
 MSE of pDRS: 0.01 . . . <0.1
 CAS size of ≥5 with ≥4 streams (UEs) per CAS should be supported One option to overcome the issue might be to schedule UEs intentionally on a higher number of PRBs to collect sufficient CSI information.

The contrary approach would be to schedule UEs as long as possible/useful on the same PRBs so that the available feedback fits to the scheduling decision. As PRBs will be selected typically on good radio channels these have an inherent tendency to stay constant for a longer time so that there is a good chance for this type of scheduling.

A third solution would be in combination of channel prediction using a so called model based feedback. In that case the eNBs can collect pDRS feedback over a longer time period, apply channel prediction for the Tx time and combine all available feedback.

It is emphasized that CoMP is intended for UEs having large amount of data to be send as otherwise overall overhead for organization, channel estimation and feedback overhead will be probably not paid off. For that reason there is a good chance that UEs are scheduled on a high number of PRBs providing quite good overall CSI information.

Figure 17:
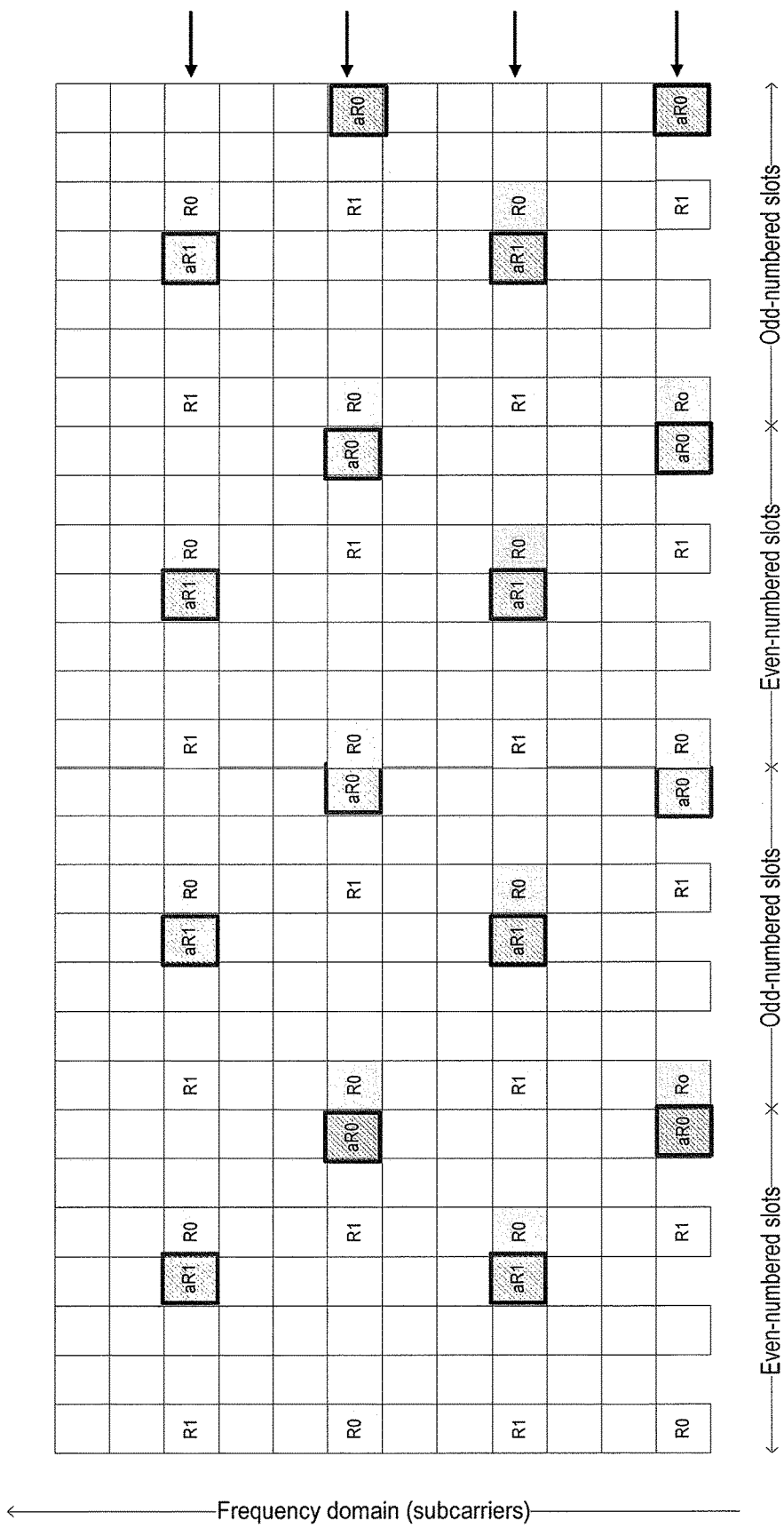
FIG. 17 shows possible allocation of pDRS combining two subsequent subframes according to the fourth embodiment.

FIG. 17 illustrates a possible allocation of orthogonal pDRS in two subsequent subframes based on FDM and CDM. It is noted that four arrows on the right part of the figure indicate a CDM sequence of length 4. CDM has the advantage that UEs do not have to be aware of the number of current spatial streams on air so eNBs have full scheduling freedom. If an UE tries to estimate streams not transmitting currently it will just measure no interference. At the same time the free CDM sequences might be used for specific optimizations like:

UE can decode all the available CDM sequences. There could be CDM sequences without associated data transmissions (only pDRS's are transmitted). These CDM sequences could be used to estimate CQI and/or optimize precoding weights in multiuser and multistream scheduling:

pDRS is spread by CDM sequence that is precoded by the weights intended to be used for another UE or for another stream with an overlapping PRB allocation. UE can report interference level or CQI based on the power difference between CDM sequences. eNB can then estimate interference between UEs or streams to find the optimum MCS parameters and if multiuser or multistream scheduling is feasible.

pDRS is spread by CDM sequence that is precoded by the weights intended to be used for the same UE in the next scheduling event. UE can report CSI or CQI based the on power/quality difference the existing CDM sequence and the candidate CDM sequence. eNB can then decide whether precoding weights should be updated or not. If radio channel is static enough search algorithms can be used to find the optimum precoding weights.

In the following, the main issues regarding the proposal to spread a CDM sequence over 2 subframes are described:
Limited overhead
4 orthogonal streams per CAS (cooperation area) supported
For 8 Tx with 8 stream transmission use FDM with less frequency resolution
Good frequency allocation for demodulation
Higher stream transmission transparent to UEs
Low mobility assumption→moderate inter code interference It is noted that instead of CDM, also FDM (frequency division multiplex) or TDM (time division multiplex) may be applied.

Following advantages and further issues can be seen for the proposed concept according to the present embodiment:

Main advantage is the minimization of RS overhead due to simultaneous usage of pDRS for demodulation as well as CSI estimation. In addition CSI estimation overhead is limited to scheduled users and to the used PRBs. This limits in addition the feedback overhead as otherwise feedback will be required at least per subband.

Due to the very sparse in time CSI-RSs there is small overhead for CSI RSs, but at the same time quite accurate CSI information is available for a first scheduling decision and a first precoding. Therefore the overall design is very robust and allows for at least moderate performance even without pDRS feedback. As soon as UEs are scheduled CSI and precoding will improve further, maximizing achievable performance.

From standardization point of view there is only a small change required, i.e. to allow feedback based on pDRS estimations instead or in addition to that based on CSI-RSs.

Figure 18:
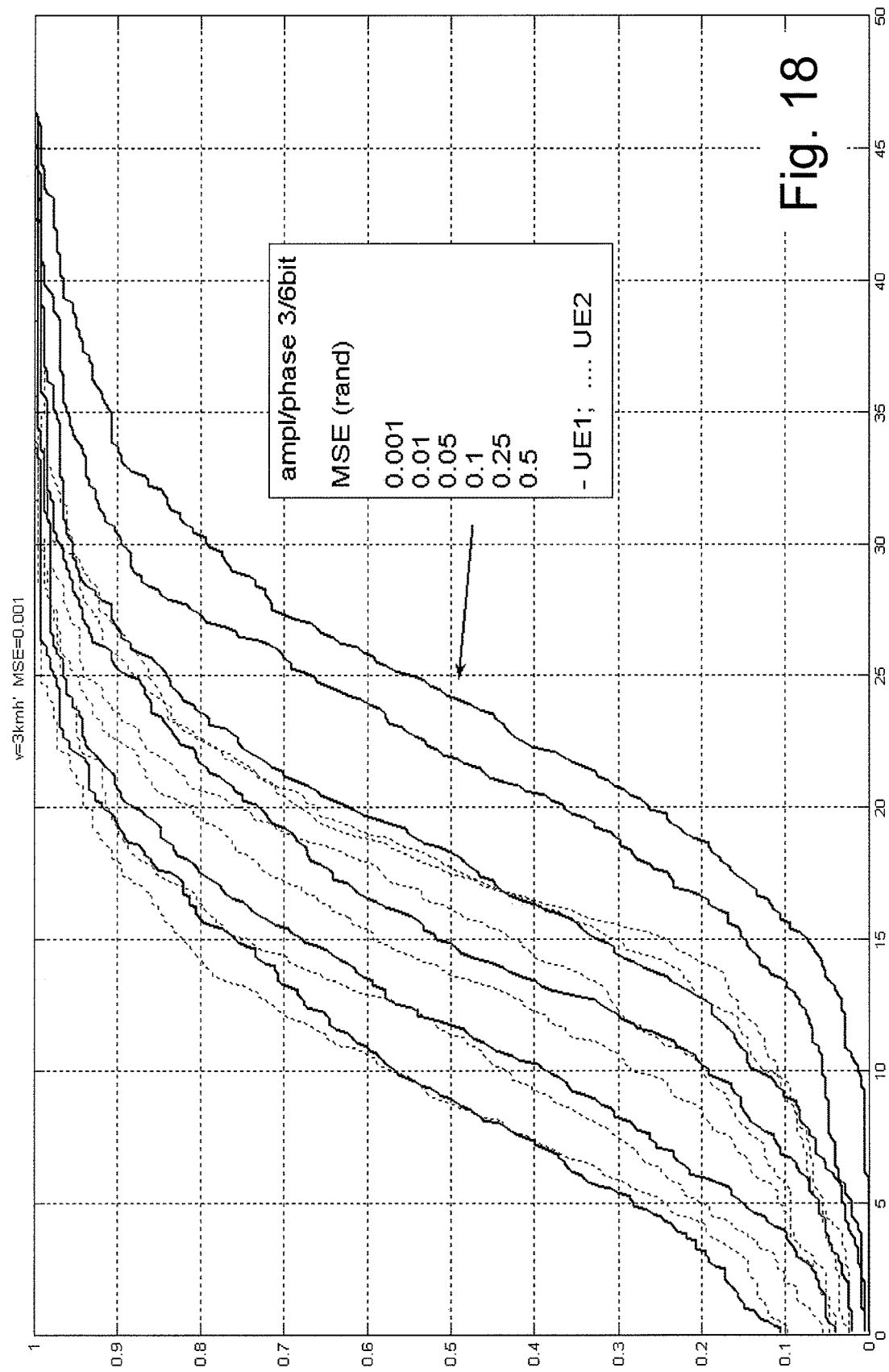
FIGS. 18 to 20 show simulation results of the procedure according to the fourth embodiment.
Figure 19:
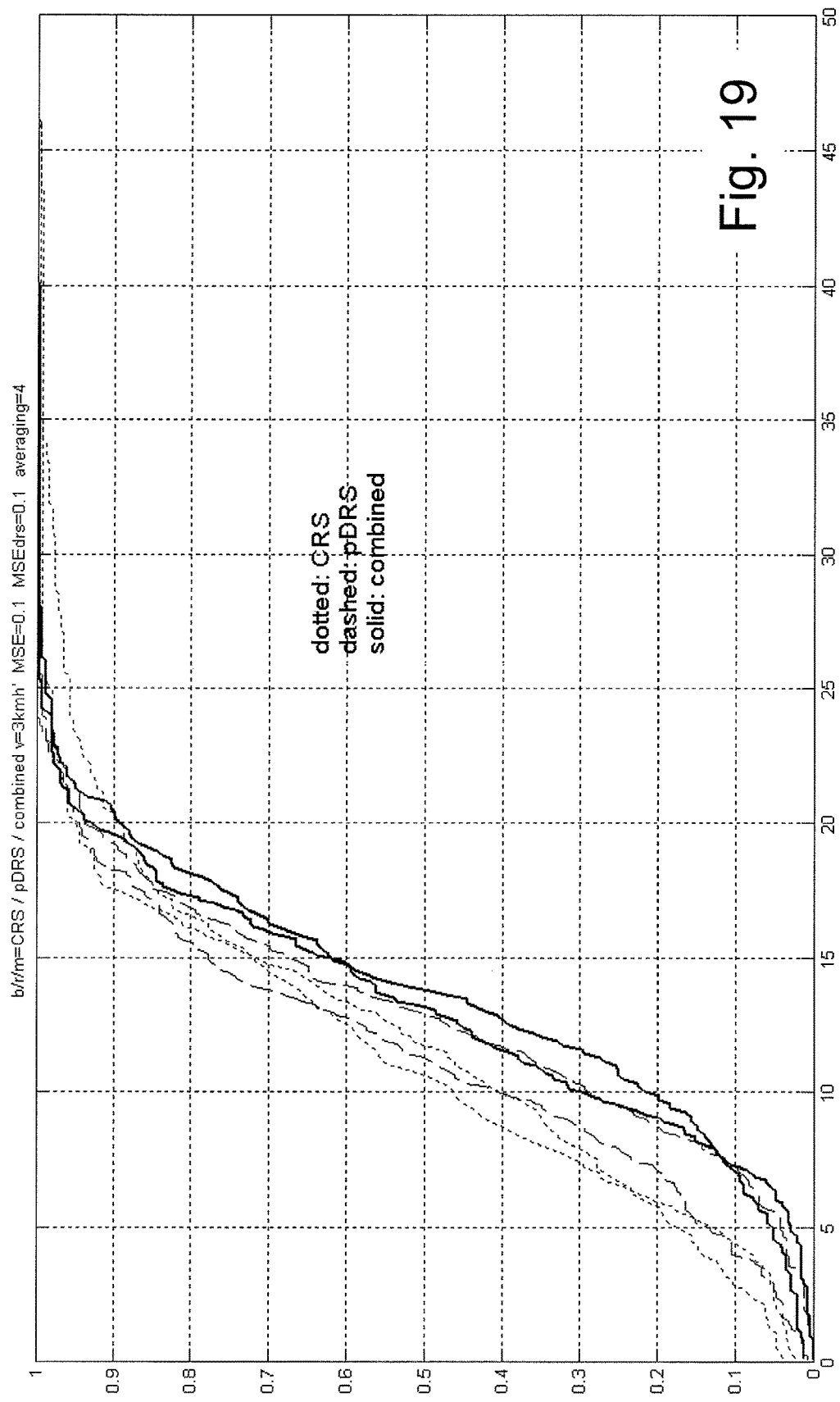
Figure 20:
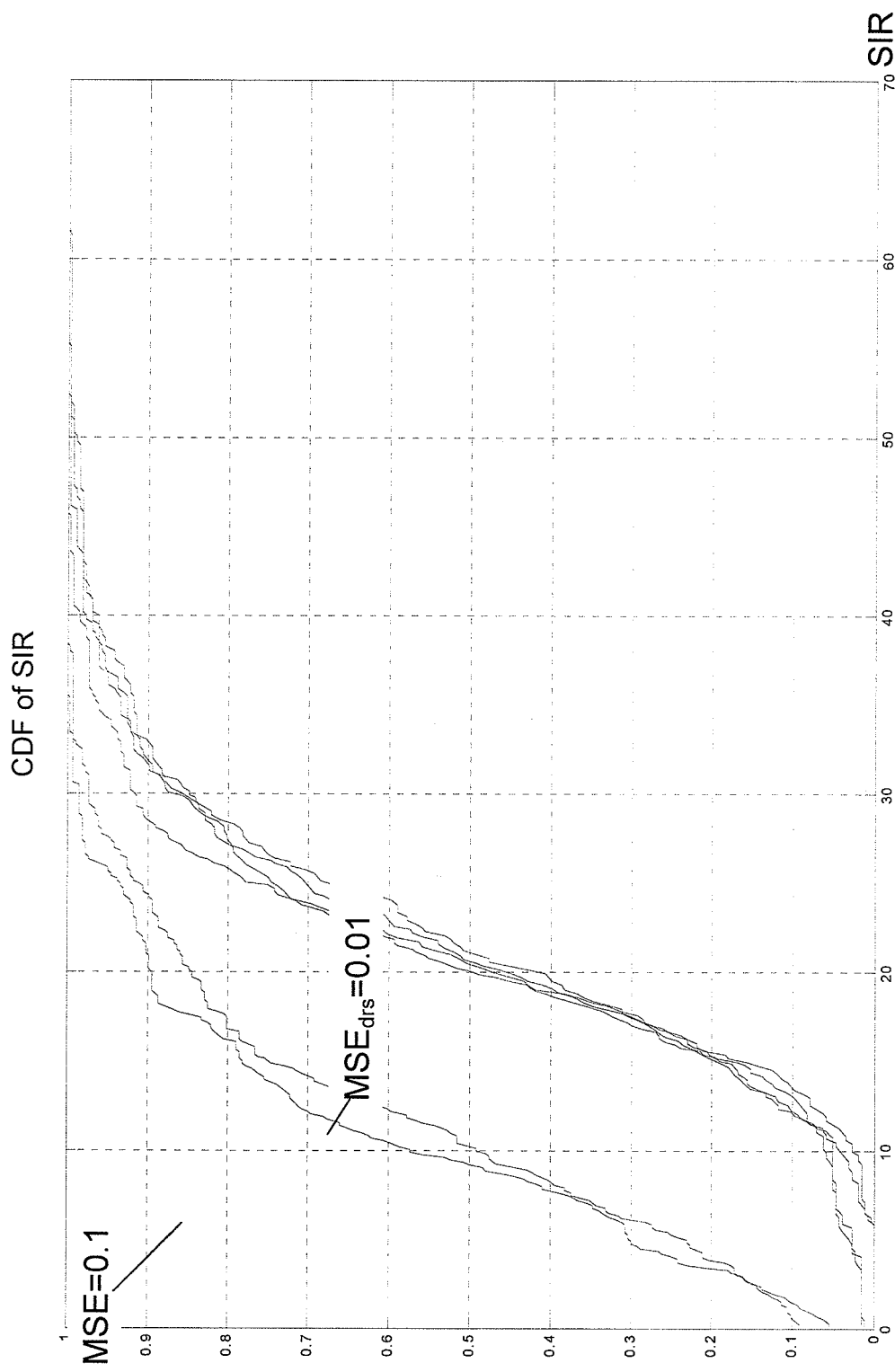

Based on simulation results for after CoMP SINR, similar to FIGS. 18, 19 and 20, overall RS overhead has been estimated and it was found that it seems to be possible to achieve the targeted 15 to 20% RS for CRS+CSI-RSs+pDRS with simultaneously good performance. At the same time feedback can be kept near to the expected upper limit for the UEs, even so there will be more careful analysis and optimization required, e.g., for some optimized feedback compression schemes. The limited RS overhead could be achieved even so it had been assumed that 80% of UEs are in CoMP mode.

In detail, FIG. 18 shows a CDF (cumulative distribution function) of achievable after CoMP SINR (signal to noise and interference ratio) for different CSI estimation errors (MSE). The dotted curves are for a feedback delay of 5 ms. As it is derivable from FIG. 18, SIR at 50% is roughly similar to MSE. There is some estimator gain for larger MSEs and some limitations for very low MSE due to PMI quantization.

FIG. 19 shows CDF of after CoMP SINR for MSE of 0.1 in case of CRS (dotted), pDRS (dashed) and MRC combining of both (solid). To improve CSI accuracy, averaging over 4 subsequent subframes has been applied. As derivable from FIG. 19, in case averaging over subframes is possible, this provides good gains.

FIG. 20 shows CDF of after CoMP SINR for MSE of 0.1 in case of CRS (curves on the left part of the figure) and MSE of 0.01 for pDRS and MRC combining of both. As derivable from FIG. 20, the pDRS performance defines overall MSE of CSI estimation.

It is noted that the embodiments and their general or specific examples described above can be combined arbitrarily.

In the following, several embodiments of the invention are described in generic terms by referring to several aspects thereof.

According to a first aspect of several embodiments of the invention, an method is provided which comprises
controlling a coordinated transmission between network control elements and terminals on resource elements,
detecting whether a resource element comprises a specific element, and
selecting a resource element for the coordinated transmission, when it is detected that the resource element does not comprise a specific element.

The first aspect may be modified as follows:
The specific element may be a reference signal.
The method may further comprise
canceling interference caused by a transmission of a reference signal in a resource element not selected for coordinated transmission.
The canceling may be carried out in a terminal by subtracting known interference.
The method may be carried out by a central network control element by applying precompensation.

According to a second aspect of several embodiments of the invention, an method is provided which comprises
receiving a coordinated transmission from network control elements on resource elements, and canceling interference caused by a transmission of a reference signal in a resource element not selected for the coordinated transmission, by subtracting known interference.

The first and the second aspect may be modified as follows:

The reference signal may be a common reference signal.

The specific element may be a control channel symbol used for a control channel.

The detecting may be performed by detecting the number of control channel symbols assigned to a particular subframe in a cell.

The number may be detected by referring to a control format indicator.

A predetermined number of transmission points on resource elements may be scheduled for the coordinated transmission, and the method may further comprise:

applying, in case the number of transmission points which are used for the coordinated transmission is less than the predetermined number, a precompensation for the transmission, and/or interleaving of the transmission and/or applying a different modulation and coding scheme per symbol in the transmission.

According to a third aspect of several embodiments of the invention, an apparatus is provided which comprises a transmission controller configured to control a coordinated transmission between network control elements and terminals on resource elements, a detector configured to detect whether a resource element comprises a specific element, and a selector configured to select a resource element for the coordinated transmission, when it is detected that the resource element does not comprise a specific element.

The third aspect may be modified as follows:

The specific element may be a reference signal.

The apparatus may further comprise a cancelling unit configured to cancel interference caused by a transmission of a reference signal in a resource element not selected for the coordinated transmission.

The apparatus may be configured to perform the cancellation by applying precompensation.

According to a fourth aspect, an apparatus is provided which comprises a receiver configured to receive a coordinated transmission from network control elements on resource elements, and a controller configured to cancel interference caused by a transmission of a common reference signal in a resource element not selected for the coordinated transmission, by subtracting known interference.

The third and the fourth aspect may be modified as follows:

The reference signal may be a common reference signal.

The specific element may be a control channel symbol used for a control channel.

The detector may be configured to detect the number of control channel symbols assigned to a particular subframe in a cell.

The detector may be configured to detect the number by referring to a control format indicator.

A predetermined number of transmission points on resource elements may be scheduled for the coordinated transmission, and the controller may be configured to apply, in case the number of transmission points which are used for the coordinated transmission is less than the predetermined number, a precompensation for the transmission points, and/or interleaving of the transmission points and/or applying a different modulation and coding scheme per symbol in the transmission points.

According to a fifth aspect, an apparatus is provided which comprises means for controlling a coordinated transmission between network control elements and terminals on resource elements, means for detecting whether a resource element comprises a specific element, and means for selecting a resource element for the coordinated transmission, when it is detected that the resource element does not comprise a specific element.

The fifth aspect may be modified as follows:

The specific element may be a reference signal.

The apparatus may further comprise means for cancelling interference caused by a transmission of a reference signal in a resource element not selected for the coordinated transmission.

The apparatus may further comprise means for performing the cancellation by applying precompensation.

According to a sixth aspect, an apparatus is provided which comprises means for receiving a coordinated transmission from network control elements on resource elements, and means for cancelling interference caused by a transmission of a common reference signal in a resource element not selected for the coordinated transmission, by subtracting known interference.

The fifth and sixth aspects may be modified as follows:

The reference signal may be a common reference signal.

The specific element may be a control channel symbol used for a control channel.

The apparatus may further comprise means for detecting the number of control channel symbols assigned to a particular subframe in a cell.

The apparatus may further comprise means for detecting the number by referring to a control format indicator.

A predetermined number of transmission points on resource elements may be scheduled for the coordinated transmission, and the apparatus may further comprise means for applying, in case the number of transmission points which are used for the coordinated transmission is less than the predetermined number, a precompensation for the transmission points, and/or interleaving of the transmission points and/or applying a different modulation and coding scheme per symbol in the transmission points.

According to the first to sixth aspects, the resource elements used in a subframe which do not contain a control channel symbol are used for a shared channel for transmitting data.

According to the first to sixth aspects, all the resource elements may constitute OFDM symbols, the control channel may be a physical downlink control channel and the shared channel may be a physical downlink shared channel.

According to a seventh aspect of several embodiments of the invention, an method is provided which comprises controlling transmitting of reference signals in resource elements of a resource block in a coordinated transmission between network control elements and terminals, using, for a sequence of reference signals, a single reference signal for all terminals, and spatially precoding the single reference signal for each terminal.

The seventh aspect may be modified as follows:

The reference signal may be a precoded dedicated reference signal.

The method may further comprise using, for first reference signals in a first resource block of the sequence of the reference signals, orthogonal reference signals.

During the transmission, in predetermined resource elements and/or predetermined resource blocks orthogonal reference signals may be used.

The orthogonal reference signal may be an orthogonal precoded dedicated reference signal.

A zero force like precoding may be used in the coordinated transmission.

The spatially precoding may be performed by beamforming.

The method may be carried out by one of the network control elements or by a central unit.

According to an eighth aspect of several embodiments of the invention, an apparatus is provided which comprises a controller configured to control transmitting of reference signals in resource elements of a resource block in a coordinated transmission between network control elements and terminals, and to use, for a sequence of reference signals, a single reference signal for all terminals, and a precoding unit configured to spatially precode the single reference signal for each terminal.

The eighth aspect may be modified as follows:

The reference signal may be a precoded dedicated reference signal.

The controller may be configured to use, for first reference signals in a first resource block of the sequence of the reference signals, orthogonal reference signals.

The controller may be configured to use, during the transmission, in predetermined resource elements and/or in predetermined resource blocks orthogonal reference signals.

The orthogonal reference signal may be an orthogonal precoded dedicated reference signal.

The precoding unit may be configured to use a zero force like precoding in the coordinated transmission.

The precoding unit may be configured to perform the spatially precoding by beamforming.

According to an ninth aspect of several embodiments of the invention, an apparatus is provided which comprises means for controlling transmitting of reference signals in resource elements of a resource block in a coordinated transmission between network control elements and terminals, means for using, for a sequence of reference signals, a single reference signal for all terminals, and means for spatially precoding the single reference signal for each terminal.

The ninth aspect may be modified as follows:

The reference signal may be a precoded dedicated reference signal.

The apparatus may comprise means for using, for first reference signals in a first resource block of the sequence of the reference signals, orthogonal reference signals.

The apparatus may comprise means for using, during the transmission, in predetermined resource elements and/or in predetermined resource blocks orthogonal reference signals.

The orthogonal reference signal may be an orthogonal precoded dedicated reference signal.

The apparatus may comprise means for using a zero force like precoding in the coordinated transmission.

The apparatus may comprise means for performing the spatially precoding by beamforming.

According to the eight and ninth aspect, the apparatus may be one of the network control elements or may be part of one of the network control elements, or may be a central unit or may be part of a central unit.

According to a tenth aspect of several embodiments of the invention, an method is provided which comprises sending an orthogonal precoded dedicated reference signal to a terminal, receiving a channel estimation result, which is estimated by the terminal using the precoded dedicated reference signal, and determining channel information based on the received channel estimation result.

The tenth aspect may be modified as follows:

The orthogonal precoded dedicated reference signal may be sent to a plurality of terminals, a plurality of channel estimation results may be received, and the channel information may be determined based on the plurality of channel estimation results.

The method may further comprise:

receiving, from the terminal, interference information with respect to interference from other terminals estimated based on the orthogonal precoded dedicated reference signal, wherein the channel information is determined based on the received channel estimation result and the received interference information.

In the determination of the channel information, a precoding correction matrix may be calculated, and the precoding correction matrix may be used for further transmissions.

For estimating a channel state, first channel state information reference signals may be used, and the estimated channel state may be corrected by performing repeatedly the sending of the orthogonal precoded dedicated reference signal, receiving an channel estimation result, and determining the channel information.

A plurality of orthogonal precoded dedicated reference signals may be sent to a plurality of terminals, wherein the orthogonal precoded dedicated reference signals may be allocated on at least one subframe based on frequency division multiplex and/or code division multiplex and/or time division multiplex.

The method may further comprise allocating the orthogonal precoded dedicated reference signal for each terminal on the at least one subframe by using code division multiplex, frequency division multiplex or time division multiplex precoded by weights to be used of other terminals with an overlapping resource block allocation, or precoded by weights to be used for the same terminal in a next scheduling event.

Precoded dedicated reference signals may be sent on resource elements currently not scheduled in order to allow for sounding radio channels corresponding to the resource elements for future scheduling decisions.

According to an eleventh aspect of several embodiments of the invention, a method is provided which comprises receiving an orthogonal precoded dedicated reference signal, performing channel estimation using the precoded dedicated reference signal, and sending a channel estimation result to a network control element.

The method according to the eleventh aspect may further comprise estimating interference from other terminal based on the precoded dedicated reference signal, and sending the interference information to the network control element.

According to a twelfth aspect of several embodiments of the invention, an apparatus is provided which comprises a sender configured to send an orthogonal precoded dedicated reference signal to a terminal,
- a receiver configured to receive a channel estimation result, which is estimated by the terminal using the orthogonal precoded dedicated reference signal, and
- a controller configured to determine channel information based on the received channel estimation result.

The twelfth aspect may be modified as follows:

The sender may be configured to send orthogonal precoded dedicated reference signals to a plurality of terminals, the receiver may be configured to receive a plurality of channel estimation results, and the controller may be configured to determine the channel information based on the plurality of channel estimation results.

The receiver may be configured to receive, from the terminal, interference information with respect to interference from other terminals estimated based on the orthogonal precoded dedicated reference signal, and the controller may be configured to determine the channel information based on the received channel estimation result and the received interference information.

The controller may be configured to calculate a precoding correction matrix, wherein the precoding correction matrix may be used for further transmissions.

The controller may be configured to use, for estimating a channel state, first channel state information reference signals and to correct the estimated channel state by performing repeatedly the sending of the orthogonal precoded dedicated reference signal, receiving an channel estimation result, and determining the channel information.

The sender may be configured to send a plurality of orthogonal precoded dedicated reference signals to a plurality of terminals, and the controller may be configured to allocate the orthogonal precoded dedicated reference signals on at least one subframe based on frequency division multiplex and/or code division multiplex.

The controller may be configured to allocate the orthogonal precoded dedicated reference signal for each terminal on the at least one subframe by using code division multiplex, frequency division multiplex or time division multiplex precoded by weights to be used of other terminals with an overlapping resource block allocation, or precoded by weights to be used for the same terminal in a next scheduling event.

The controller may be configured to send precoded dedicated reference signals on resource elements currently not scheduled in order to allow for sounding radio channels corresponding to the resource elements for future scheduling decisions.

According to a thirteenth aspect of several embodiments of the invention, an apparatus is provided which comprises
- a receiver configured to receive an orthogonal precoded dedicated reference signal,
- a controller configured to perform a channel estimation using the orthogonal precoded dedicated reference signal, and
- a sender configured to send a channel estimation result to a network control element.

According to a modification of the thirteenth aspect, the controller may be configured to estimate interference from at least one other terminal based the orthogonal precoded dedicated reference signal, and the sender may be configured to send the interference information to the network control element.

According to a fourteenth aspect of several embodiments of the invention, an apparatus is provided which comprises
- means for sending an orthogonal precoded dedicated reference signal to a terminal,
- receiving a channel estimation result, which is estimated by the terminal using the orthogonal precoded dedicated reference signal, and
- determining channel information based on the received channel estimation result.

The fourteenth aspect may be modified as follows:

The apparatus may comprise means for sending orthogonal precoded dedicated reference signals to a plurality of terminals, means for receiving a plurality of channel estimation results, and means for determining the channel information based on the plurality of channel estimation results.

The apparatus may comprise means for receiving, from the terminal, interference information with respect to interference from other terminals estimated based on the orthogonal precoded dedicated reference signal, and means for determining the channel information based on the received channel estimation result and the received interference information.

The apparatus may comprise means for calculating a precoding correction matrix, wherein the precoding correction matrix may be used for further transmissions.

The apparatus may comprise means for using, for estimating a channel state, first channel state information reference signals and means for correcting the estimated channel state by performing repeatedly the sending of the orthogonal precoded dedicated reference signal, receiving an channel estimation result, and determining the channel information.

The apparatus may comprise means for sending a plurality of orthogonal precoded dedicated reference signals to a plurality of terminals, and means for allocating the orthogonal precoded dedicated reference signals on at least one subframe based on frequency division multiplex and/or code division multiplex.

The apparatus may comprise means for allocating the orthogonal precoded dedicated reference signal for each terminal on the at least one subframe by using code division multiplex, frequency division multiplex or time division multiplex precoded by weights to be used of other terminals with an overlapping resource block allocation, or precoded by weights to be used for the same terminal in a next scheduling event.

The apparatus may comprise means for sending precoded dedicated reference signals on resource elements currently not scheduled in order to allow for sounding radio channels corresponding to the resource elements for future scheduling decisions.

According to a fifteenth aspect of several embodiments of the invention, an apparatus is provided which comprises
- means for receiving an orthogonal precoded dedicated reference signal,
- means for performing a channel estimation using the orthogonal precoded dedicated reference signal, and
- means for sending a channel estimation result to a network control element.

According to a modification of the fifteenth aspect, the apparatus may comprise means for estimating interference from at least one other terminal based the orthogonal precoded dedicated reference signal, and means for sending the interference information to the network control element.

In the aspects and modifications thereof as described above, the coordinated transmission may be a multipoint coordinated (CoMP) transmission or a multi-user multiple input multiple output (MU-MIMO) transmission or similar.

According to a sixteenth aspect of several embodiments of the present invention, a computer program product is provided which include a program for a processing device, comprising software code portions for performing the method according to any of the above when the program is run on the processing device.

According to a tenth aspect of several embodiments of the present invention, a computer program product is provided which comprises code means for performing a method according any of the above first, second, seventh, tenth and eleventh aspects or their modifications when run on a processing means or module.

The computer program product may comprise a computer-readable medium on which the software code portions are stored.

The program may be directly loadable into an internal memory of the processing device.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, UE, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Thus, any of the first to fifteenth aspects described above may be implemented by an apparatus comprising a memory and a processor, wherein the memory stores instructions by which the processor may carry out the different functions/processes as described above in the first to fifteenths aspects.

It is noted that the embodiments and general and specific examples described above are provided for illustrative purposes only and are in no way intended that the present invention is restricted thereto. Rather, it is the intention that all variations and modifications be included which fall within the spirit and scope of the appended claims.

The invention claimed is:

1. A method comprising
controlling a coordinated transmission between network control elements and terminals on resource elements in a plurality of cells forming a cooperation area, the controlling comprising:
detecting whether a resource element of the resource elements comprises or does not comprise a specific element,
selecting the resource element for use in a cell of the plurality of cells for the coordinated transmission, in response to it being detected that the resource element does not comprise the specific element from the cell, and
restricting cooperation in the cooperation area for the selected resource element only to those cells which do not transmit the specific element on the selected resource element, but transmit a physical downlink shared channel on the selected resource element.

2. The method according to claim 1, wherein the coordinated transmission is a multipoint coordinated (CoMP) transmission or a multi-user multiple input multiple output (MU-MIMO) transmission.

3. The method according to claim 1, wherein the specific element is a reference signal.

4. The method according to claim 3, further comprising canceling interference caused by a transmission of said reference signal in a resource element not selected for coordinated transmission.

5. The method according to claim 4, wherein the canceling is carried out in a terminal or in a network element by subtracting known interference.

6. The method according to claim 4, wherein the method is carried out by a central network control element by applying precompensation.

7. The method according to claim 1, wherein the specific element is a control channel symbol used for a control channel and, wherein a predetermined number of transmission points on resource elements are scheduled for the coordinated transmission, the method further comprising:
applying, in case the number of transmission points which are used for the coordinated transmission is less than the predetermined number, a precompensation for the transmission, and/or interleaving of the transmission and/or applying a different modulation and coding scheme per symbol in the transmission.

8. A non-transitory computer readable memory storing a program comprising software code portions for performing the method of claim 1 when the program is run on a processing device.

9. The non-transitory computer readable memory according to claim 8, wherein the program is directly loadable into an internal memory of the processing device.

10. A method comprising
performing at least the following as part of communication for a coordinated transmission between a network element and a terminal:
applying a resource element for coordinated transmissions in a cooperation area, wherein the cooperation area is formed by a plurality of cells and cooperation in the cooperation area on the resource element is restricted only to those cells which do not transmit a specific element on the resource element, but transmit a physical downlink shared channel on the resource element,
detecting information indicating that another cell in the cooperation area transmits the specific element on the resource element, and
receiving a data transmission over a physical downlink shared channel while detecting the information indicating that another cell in the cooperation area transmits the specific element on the resource element.

11. The method according to claim 10, wherein the specific element is a reference signal.

12. The apparatus according to claim 11, wherein the specific element is a control channel symbol used for a control channel and, wherein a predetermined number of transmission points on resource elements are scheduled for the coordinated transmission, and wherein the at least one processor is configured with the memory and the program of instructions to cause the apparatus:
to apply, in case the number of transmission points which are used for the coordinated transmission is less than the predetermined number, a precompensation for the transmission, and/or interleaving of the transmission and/or applying a different modulation and coding scheme per symbol in the transmission.

13. The method according to claim 10, wherein a predetermined number of transmission points is scheduled for the coordinated transmissions on the resource element in the cooperation area, the method further comprising
applying, in case the number of transmission points which are used for the coordinated transmissions is less than the predetermined number, a precompensation for the transmissions, and/or interleaving of the transmissions and/or applying a different modulation and coding scheme per symbol in the transmissions.

14. The method according to claim 10, wherein the specific element comprises a control channel symbol.

15. The method according to claim 10, wherein the method is carried out by applying precompensation or precoding.

16. The method according to claim 10, wherein the coordinated transmission is a multipoint coordinated (CoMP) transmission or a multi-user multiple input multiple output (MU-MIMO) transmission.

17. An apparatus comprising
at least one processor, and
a memory storing a program of instructions,
wherein the at least one processor is configured with the memory and the program of instructions to cause the apparatus:
to control a coordinated transmission between network control elements and terminals on resource elements in a plurality of cells forming a cooperation area, the controlling causing the apparatus:
to detect whether a resource element of the resource elements comprises or does not comprise a specific element, and
to select the resource element for use in a cell of the plurality of cells for the coordinated transmission, in response to it being detected that the resource element does not comprise the specific element from the cell, and
to restrict cooperation in the cooperation area for the selected resource element only to those cells which do not transmit the specific element on the selected resource element, but to transmit a physical downlink shared channel on the selected resource element.

18. The apparatus according to claim 17, wherein the specific element is a reference signal.

19. The apparatus according to claim 18, wherein the at least one processor is configured with the memory and the program of instructions to cause the apparatus to cancel interference caused by a transmission of the reference signal in a resource element not selected for the coordinated transmission.

20. The apparatus according to claim 19, wherein the apparatus is caused to perform the cancellation by applying precompensation.

21. The apparatus according to claim 17, wherein a predetermined number of transmission points is scheduled for the coordinated transmissions on the resource element in the cooperation area,
wherein the at least one processor is configured with the memory and the program of instructions to cause the apparatus to apply, in case the number of transmission points which are used for transmitting the transmissions is less than the predetermined number, a precompensation for the transmissions, and/or perform an interleaving of the transmissions and/or apply a different modulation and coding scheme per symbol in the transmissions.

22. The apparatus according to claim 17, wherein the coordinated transmission is a multipoint coordinated (CoMP) transmission or a multi-user multiple input multiple output (MU-MIMO) transmission.

23. An apparatus comprising
at least one processor, and
a memory storing a program of instructions,
wherein the at least one processor is configured with the memory and the program of instructions to cause the apparatus:
to perform at least the following as part of communication for a coordinated transmission between a network element and a terminal:
to apply a resource element for coordinated transmissions in a cooperation area, between a network element and a terminal, wherein the cooperation area is formed by a plurality of cells and cooperation in the cooperation area on the resource element is restricted only to those cells which do not transmit a specific element on the resource element, but to transmit a physical downlink shared channel on the resource element;
to detect information indicating that another cell in the cooperation area transmits the specific element on the resource element, and
to receive a data transmission over a physical downlink shared channel while detecting the information indicating that another cell in the cooperation area transmits the specific element on the resource element.

24. The apparatus according to claim 23, wherein the specific element is a reference signal.

25. The apparatus according to claim 23, wherein the specific element comprises a control channel symbol.

26. The apparatus according to claim 25, where the at least one processor is configured with the memory and the program of instructions to cause the apparatus to perform the following: to cancel interference caused by a transmission of said reference signal in a resource element not selected for coordinated transmission and to perform the cancellation by applying precompensation or precoding.

27. The apparatus according to claim 25, where the at least one processor is configured with the memory and the program of instructions to cause the apparatus to perform the following: to cancel interference caused by a transmission of said reference signal in a resource element not selected for coordinated transmission and to perform the cancellation by subtracting known interference.

28. The apparatus according to claim 23, wherein the coordinated transmission is a multipoint coordinated (CoMP) transmission or a multi-user multiple input multiple output (MU-MIMO) transmission.

* * * * *